(12) United States Patent
Hang et al.

(10) Patent No.: US 12,489,503 B2
(45) Date of Patent: Dec. 2, 2025

(54) INFORMATION TRANSMISSION METHOD, RELATED APPARATUS, AND DEVICE

(71) Applicant: HUAWEI TECHNOLOGIES CO., LTD., Guangdong (CN)

(72) Inventors: Haicun Hang, Shanghai (CN); Xiaohan Wang, Shanghai (CN); Huangping Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 349 days.

(21) Appl. No.: 18/304,005

(22) Filed: Apr. 20, 2023

(65) Prior Publication Data
US 2023/0261715 A1  Aug. 17, 2023

Related U.S. Application Data

(63) Continuation of application No. PCT/CN2020/122580, filed on Oct. 21, 2020.

(51) Int. Cl.
*H04B 7/06* (2006.01)

(52) U.S. Cl.
CPC ................... *H04B 7/0626* (2013.01)

(58) Field of Classification Search
CPC .. H04B 7/0626; H04B 7/0456; H04B 7/0639; H04B 7/0417; H04B 7/0478;
(Continued)

(56) References Cited

U.S. PATENT DOCUMENTS

2008/0268862 A1* 10/2008 Kent ................ H04B 7/0632
  455/452.2
2010/0104033 A1  4/2010 Gorokhov
(Continued)

FOREIGN PATENT DOCUMENTS

| CN | 102237950 A | 11/2011 |
|----|-------------|---------|
| CN | 103959839 A | 7/2014  |
| JP | 2011234368 A | 11/2011 |

OTHER PUBLICATIONS

SAMSLING NG tunnelling to support of dual connectivity in SG3GPP TSG-RAN WG3 #96, R3-171639, Sep. 19, 2017, total 3 pages.
(Continued)

*Primary Examiner* — Ajibola A Akinyemi
(74) *Attorney, Agent, or Firm* — WOMBLE BOND DICKINSON (US) LLP

(57) ABSTRACT

This application provides an information transmission method, an apparatus, and a device, which are applicable to the communication field, and are used to feed back information obtained based on channel information of different network devices, so as to improve performance gains and reduce performance loss. The method includes: The terminal device obtains at least one piece of channel information including large-scale information and small-scale information; performs normalization processing on the channel information to obtain at least one piece of first information and at least one piece of second information, where the first information is small-scale information obtained through normalization processing, and the second information is large-scale information obtained through normalization processing; and then sends channel state information including R pieces of first information obtained through quantization processing or including R pieces of first information obtained through quantization processing and R pieces of second information obtained through quantization processing.

20 Claims, 7 Drawing Sheets

(58) Field of Classification Search
CPC .... H04B 7/063; H04B 7/0617; H04B 7/0469; H04B 7/024; H04B 7/0634; H04B 7/0452; H04B 7/06; H04B 7/0658; H04B 7/0632
USPC ......................................................... 455/101
See application file for complete search history.

(56) References Cited

U.S. PATENT DOCUMENTS

2011/0274185 A1* 11/2011 Gan ..................... H04B 7/0417
 375/259
2012/0115427 A1 5/2012 Hui et al.
2012/0188899 A1* 7/2012 Zhang ............... H04L 25/03898
 370/252
2014/0348106 A1 11/2014 Bao et al.

OTHER PUBLICATIONS

Qualcomm, Scaling and Quantization for CSI Matrices Feedback. IEEE 802.11-06/0594r2, Nov. 2006, 3 pages.

* cited by examiner

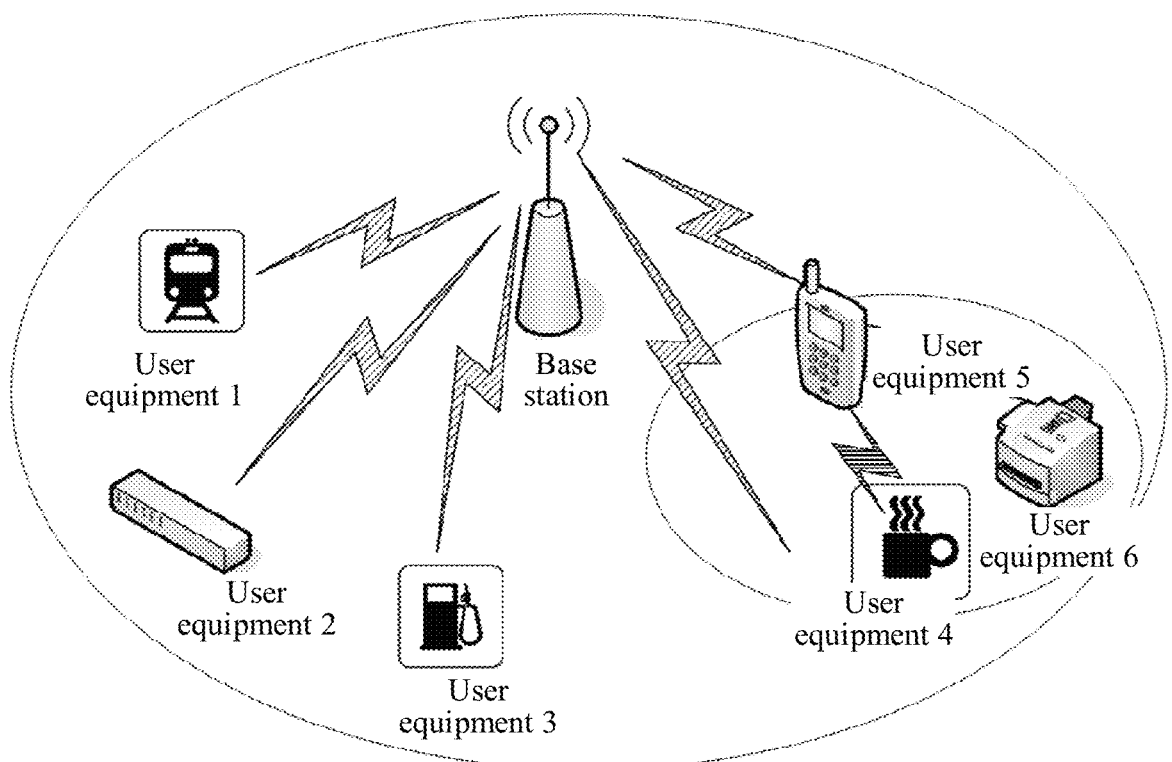
(A)
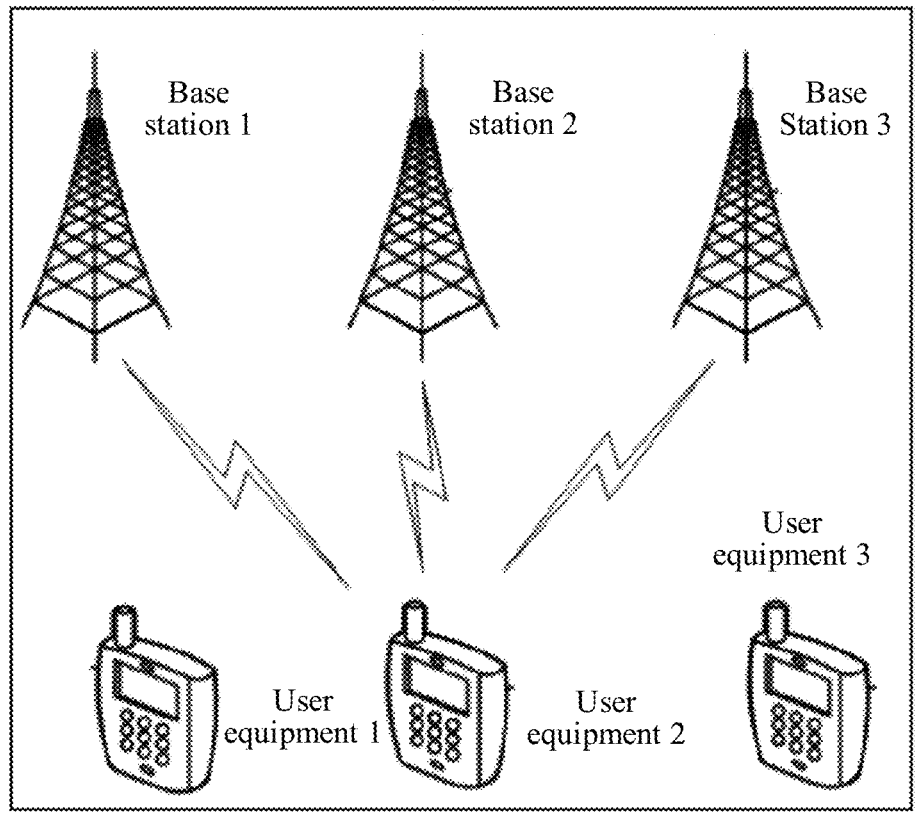
(B)
FIG. 1

S101: A terminal device obtains R pieces of channel information, where the channel information includes large-scale information and small-scale information, and R is an integer greater than or equal to 1

S102: The terminal device performs normalization processing on the R pieces of channel information to obtain R pieces of first information and R pieces of second information, where the first information is small-scale information obtained through normalization processing, and the second information is large-scale information obtained through normalization processing

S103: The terminal device sends channel state information CSI, where the CSI includes R pieces of first information obtained through quantization processing, or R pieces of first information obtained through quantization processing and R pieces of second information obtained through quantization processing

FIG. 3

S201: A network device receives channel state information CSI, where the CSI includes R pieces of first information obtained through quantization processing, or R pieces of first information obtained through quantization processing and R pieces of second information obtained through quantization processing, the first information is small-scale information obtained through normalization processing, the second information is large-scale information obtained through normalization processing, the small-scale information and the large-scale information belong to channel information, and R is an integer greater than or equal to 1

S202: The network device obtains target channel information based on the CSI, where the target channel information includes small-scale information corresponding to the network device and large-scale information corresponding to the network device

FIG. 4

INFORMATION TRANSMISSION METHOD, RELATED APPARATUS, AND DEVICE

CROSS-REFERENCE TO RELATED APPLICATIONS

This application is a continuation of International Application No. PCT/CN2020/122580, filed on Oct. 21, 2020, the disclosure of which is hereby incorporated by reference in its entirety.

TECHNICAL FIELD

Embodiments of this application relate to the communication field, and in particular, to an information transmission method, a related apparatus, and a device.

BACKGROUND

The new radio (NR) communication system has higher requirements on a system capacity, spectrum efficiency, and the like. In a 5G communication system, a massive multi-antenna technology plays an important role in spectral efficiency of the system. To improve system throughput performance and user experience, a multi-station coordination manner is usually used to serve a user.

At present, the latest codebook is a space-frequency dual-domain compressed codebook. However, in the dual-domain compressed codebook, a channel measured by user equipment (UE) is independently reported for each rank. Therefore, when reporting channel state information (CSI), the terminal device mainly reports a selected space domain beam, a selected frequency domain beam, and a corresponding weighting coefficient. The corresponding weighting coefficient may be quantized before being reported.

However, in a multi-station transmission scenario, there is a phase difference for each transmission reception point (TRP), and sparseness between each TRP and the UE is also different. In addition, importance of CSI fed back by a terminal to a TRP is also different. Therefore, a performance loss is increased.

SUMMARY

Embodiments of this application provide an information transmission method, a related apparatus, and a device, to feed back different small-scale information or feed back different small-scale information and large-scale information for different network devices, so as to improve a performance gain, and reduce a performance loss.

According to a first aspect, this application provides an information transmission method. The method may be performed by a terminal device, or may be performed by a chip disposed in a terminal device. This is not limited in this application. The method includes: A terminal device obtains R pieces of channel information, where the channel information includes large-scale information and small-scale information, and R is an integer greater than or equal to 1; then performs normalization processing on the R pieces of channel information to obtain R pieces of first information and R pieces of second information, where the first information is small-scale information obtained through normalization processing, and the second information is large-scale information obtained through normalization processing; and finally sends channel state information CSI, where the CSI includes R pieces of first information obtained through quantization processing, or R pieces of first information obtained through quantization processing and R pieces of second information obtained through quantization processing.

In this embodiment, the terminal device obtains channel information of different network devices, and performs normalization processing and quantization processing on large-scale information and small-scale information included in the channel information. Because sparseness between each network device and the terminal device is different, importance of CSI sent by the terminal to a TRP is also different, and importance of CSI fed back by the terminal device to the network device is also different, feeding back information obtained by using channel information of different network devices can improve a performance gain and reduce a performance loss.

In an embodiment of this application, the channel information is information in at least one frequency domain unit. The frequency domain unit may be at least one resource element (RE), at least one resource block (RB), or at least one subband.

In this embodiment, the channel information is refined as information in a plurality of frequency domain units, and the first information is further quantized to provide a frequency domain beam resource. In addition, the frequency domain unit may be a plurality of different units, thereby improving flexibility of this solution.

In an example embodiment of this application, the first information includes a first space domain beam set, a first frequency domain beam set, and a first weighting coefficient set. In addition, the first information obtained through quantization processing includes a second space domain beam set, a second frequency domain beam set, and a second weighting coefficient set. The second space domain beam set is a subset of the first space domain beam set, the second frequency domain beam set is a subset of the first frequency domain beam set, and the second weighting coefficient set is obtained by performing quantization on a subset of the first weighting coefficient set.

In this embodiment, the first information obtained through quantization processing includes the second space domain beam set and the second frequency domain beam set. The second space domain beam set and the second frequency domain beam set may be directly fed back, or may be fed back by using a parameter index, for example, fed back by using a precoding matrix indicator (PMI). Therefore, when one piece of CSI includes a plurality of channel measurement resources, each piece of channel information may be arranged in order.

In this embodiment, the second space domain beam set is a subset of the first space domain beam set, the second frequency domain beam set is a subset of the first frequency domain beam set, and the second weighting coefficient set is obtained by quantizing a subset of the first weighting coefficient set. In this process, a quantity of space domain beams may be jointly selected, so as to resolve a problem that space domain sparseness of channels between network devices is different. In addition, a quantity of frequency domain beams may be jointly selected, so as to resolve a problem that frequency domain sparseness of channels between network devices is different. In addition, a quantity of weighting coefficients is jointly selected, so as to resolve a problem that different network devices require different quantities of weighting coefficients due to different large-scale information or different channel sparseness.

In an example embodiment of this application, channel measurement configuration information is received, where the channel measurement configuration information is used for determining a maximum value of a total quantity of space domain beams in R second space domain beam sets; or channel measurement configuration information is received, where the channel measurement configuration information is used for determining a maximum value of a quantity of space domain beams in each second space domain beam set, and one second space domain beam set corresponds to one maximum value of a quantity of space domain beams in the second space domain beam set.

In this embodiment, the received channel measurement configuration information may further be used to determine a maximum value of a quantity of space domain beams. Different maximum value determining manners can improve flexibility of this solution, and the quantity of space domain beams in the R second space domain beam sets is jointly determined, thereby improving feasibility of this solution.

In an example embodiment of this application, the channel measurement configuration information includes a first space domain beam value, the first space domain beam value is used for obtaining the maximum value of the total quantity of space domain beams in the R second space domain beam sets, and the first space domain beam value may be an integer or a proportional coefficient. Alternatively, the channel measurement configuration information includes a second space domain beam value, where the second space domain beam value is used for obtaining the maximum value of the quantity of space domain beams in the second space domain beam set. The second space domain beam value may be an integer or a proportional coefficient.

In this embodiment, the channel measurement configuration information may include the first space domain beam value or the second space domain beam value, to determine a maximum value of a quantity of space domain beams in different cases. Therefore, flexibility of this solution is improved. In addition, the maximum value may be further obtained through direct determining or indirect calculation, thereby further improving flexibility of determining the maximum value of the quantity of space domain beams.

In an example embodiment of this application, the total quantity of space domain beams in the R second space domain beam sets obtained through quantization processing is less than or equal to the maximum value of the total quantity of space domain beams in the R second space domain beam sets. Alternatively, the quantity of space domain beams in the second space domain beam set is less than or equal to the corresponding maximum value of the quantity of space domain beams in the second space domain beam set.

In this embodiment, a quantity of space domain beams obtained through quantization and joint selection is reduced, that is, a quantity of space domain beams included in the CSI is reduced, thereby reducing CSI reporting overheads.

In an example embodiment of this application, channel measurement configuration information is received, where the channel measurement configuration information is used for determining a maximum value of a total quantity of frequency domain beams in R second frequency domain beam sets; or channel measurement configuration information is received, where the channel measurement configuration information is used for determining a maximum value of a quantity of frequency domain beams in each second frequency domain beam set, and one second frequency domain beam set corresponds to one maximum value of a quantity of frequency domain beams in the second frequency domain beam set.

In this embodiment, the received channel measurement configuration information may further be used to determine a maximum value of a quantity of frequency domain beams. Different maximum value determining manners can improve flexibility of this solution, and the quantity of frequency domain beams in the R second frequency domain beam sets is jointly determined, thereby improving feasibility of this solution.

In an example embodiment of this application, the channel measurement configuration information includes a first frequency domain beam value, the first frequency domain beam value is used for obtaining the maximum value of the total quantity of frequency domain beams in the R second frequency domain beam sets, and the first frequency domain beam value may be an integer or a proportional coefficient. Alternatively, the channel measurement configuration information includes a second frequency domain beam value, where the second frequency domain beam value is used for obtaining the maximum value of the quantity of frequency domain beams in the second frequency domain beam set. The second frequency domain beam value may be an integer or a proportional coefficient.

In this embodiment, the channel measurement configuration information may include the first frequency domain beam value, and the maximum value of the total quantity of frequency domain beams in the R second frequency domain beam sets is obtained by using the first frequency domain beam value. Similarly, the channel measurement configuration information may further include the second frequency domain beam value, and the maximum value of the quantity of frequency domain beams in each second frequency domain beam set may be obtained by using the second frequency domain beam value, thereby further improving feasibility of this solution. In addition, the maximum value may be obtained through direct determining or indirect calculation, and therefore, flexibility of determining the maximum value of the quantity of frequency domain beams is improved.

In an example embodiment of this application, the quantity of frequency domain beams in the R second frequency domain beam sets obtained through quantization processing is less than or equal to the maximum value of the total quantity of frequency domain beams in the R second frequency domain beam sets. Alternatively, the quantity of frequency domain beams in the second frequency domain beam set obtained through quantization processing is less than or equal to the maximum value of the quantity of frequency domain beams in the corresponding second frequency domain beam set.

In this embodiment, a quantity of frequency domain beams obtained through quantization and joint selection is reduced, that is, a quantity of frequency domain beams included in the CSI is reduced, thereby reducing CSI reporting overheads.

In an example embodiment of this application, channel measurement configuration information is received, where the channel measurement configuration information is used for determining a maximum value of a total quantity of weighting coefficients in R second weighting coefficient sets; or channel measurement configuration information is received, where the channel measurement configuration information is used for determining a maximum value of a quantity of weighting coefficients in each second weighting coefficient set, and one second weighting coefficient set corresponds to one maximum value of a quantity of weighting coefficients in the second weighting coefficient set.

In this embodiment, the received channel measurement configuration information may further be used to determine a maximum value of a quantity of weighting coefficients.

Different maximum value determining manners can improve flexibility of this solution, and a quantity of weighting coefficients in the R second weighting coefficient sets is jointly determined, thereby improving feasibility of this solution.

In an example embodiment of this application, the channel measurement configuration information includes a first weighting coefficient value, the first weighting coefficient value is used for obtaining the maximum value of the total quantity of weighting coefficients in the R second weighting coefficient sets, and the first weighting coefficient value may be an integer or a proportional coefficient. Alternatively, the channel measurement configuration information includes a second weighting coefficient value, the second weighting coefficient value is used for obtaining the maximum value of the quantity of weighting coefficients in the second weighting coefficient set, and the second weighting coefficient value may be an integer or a proportional weighting coefficient.

In this embodiment, the channel measurement configuration information may include the first weighting coefficient value, and the maximum value of the total quantity of weighting coefficients in the R second weighting coefficient sets is obtained by using the first weighting coefficient value. Similarly, the channel measurement configuration information may further include the second weighting coefficient value, and the maximum value of the quantity of weighting coefficients in each second weighting coefficient set may be obtained by using the second weighting coefficient value, thereby further improving feasibility of this solution. In addition, the maximum value of the quantity of weighting coefficients may be obtained through direct determining or indirect calculation, so that flexibility of determining the maximum value of the quantity of weighting coefficients is improved.

In an example embodiment of this application, the total quantity of weighting coefficients in the R second weighting coefficient sets obtained through quantization processing is less than or equal to the maximum value of the quantity of weighting coefficients in the R second weighting coefficient sets. Alternatively, the quantity of weighting coefficients in the second weighting coefficient set obtained through quantization processing is less than or equal to the maximum value of the quantity of weighting coefficients in the corresponding second weighting coefficient set.

In this embodiment, a quantity of weighting coefficients that are jointly selected and quantized is reduced, that is, a quantity of weighting coefficients included in the CSI is reduced, thereby reducing CSI reporting overheads.

In an example embodiment of this application, quantization processing may be performed on the first weighting coefficient set in two manners. In one manner, a weighting coefficient is determined from subsets of the R first weighting coefficient sets as a first reference weighting coefficient, and the first reference weighting coefficient is a weighting coefficient with a largest amplitude in the subsets of the R first weighting coefficient sets. In other words, the first reference weighting coefficient is set to 1 as a quantization reference, then quantization processing is performed on relative amplitudes and relative phases between all weighting coefficients in the R weighting coefficient sets and the first reference weighting coefficient, to obtain the R second weighting coefficient sets. In the other manner, R second reference weighting coefficients are determined in subsets of the R first weighting coefficient sets, where a subset of one first weighting coefficient set corresponds to one second reference weighting coefficient, and the second reference weighting coefficient is a weighting coefficient with a largest amplitude in the subset of the corresponding first weighting coefficient set. That is, the second reference weighting coefficient is set to 1 as a quantization reference, then a second reference weighting coefficient is determined in the R second reference weighting coefficients as a third reference weighting coefficient, then quantization processing is performed on relative amplitudes and relative phases between the R weighting coefficient sets and the corresponding second reference weighting coefficients, and quantization processing is performed on relative amplitudes and relative phases between the R second reference weighting coefficients and the third reference weighting coefficient, to obtain the R second weighting coefficient sets.

In this embodiment, a relative relationship between small-scale information of channel information of different network devices is calculated in different manners, to improve accuracy of an obtained second weighting coefficient set, so that a corresponding network device can accurately obtain channel information after obtaining the second weighting coefficient set, thereby reducing a performance loss.

In an example embodiment of this application, the third reference weighting coefficient may be a second reference weighting coefficient with a largest amplitude in the R second reference weighting coefficients, or a second reference weighting coefficient with a smallest amplitude in the R second reference weighting coefficients; or a second reference weighting coefficient corresponding to a network device initially accessed by the terminal device is the third reference weighting coefficient; or a second reference weighting coefficient corresponding to a cell initially accessed by the terminal device is the third reference weighting coefficient; or a second reference weighting coefficient corresponding to any network device is the third reference weighting coefficient; a second reference weighting coefficient corresponding to a weighting coefficient set of a network device with a smallest identifier is the third reference weighting coefficient; or a second reference weighting coefficient corresponding to a weighting coefficient set of a network device with a largest identifier is the third reference weighting coefficient.

In this embodiment, the third reference weighting coefficient is determined in different manners, so that flexibility of this solution can be further improved.

In an example embodiment of this application, quantization processing may be performed on the second information in two manners. To ensure a relative value of energy between a plurality of pieces of channel information, one manner is to determine one piece of second information from the R pieces of second information as reference information, that is, the reference information is set to 1 as a quantization reference, and then quantization processing is performed on relative values between the R pieces of second information and the reference information, to obtain the R pieces of second information obtained through quantization processing. In addition, to improve accuracy of fed-back downlink large-scale information and improve performance, the other manner is to determine one piece of second information from the R pieces of second information as reference information, that is, set the reference information to 1 as a quantization reference, then perform quantization processing on relative values between the R pieces of second information and the reference information, and perform quantization processing on an absolute value of the reference information, to obtain the R pieces of second information obtained through quantization processing.

In this embodiment, a relative relationship between large-scale information in channel information of different network devices is calculated in different manners, to improve accuracy of second information obtained through quantization processing, so that a corresponding network device can accurately obtain channel information after obtaining the second information obtained through quantization processing, thereby reducing a performance loss.

In an example embodiment of this application, the reference information may be second information with a largest value in the R pieces of second information, or second information with a smallest value in the R pieces of second information; or second information of an initially accessed cell is the reference information; or second information of an initially accessed network device is the reference information; or second information corresponding to a weighting coefficient set of a network device that has a smallest identifier is the reference information; or second information corresponding to a weighting coefficient set of a network device that has a largest identifier is the reference information.

In this embodiment, the reference information is determined in different manners, so that flexibility of this solution can be further improved.

In an example embodiment of this application, the normalization processing method includes at least one of the following: column normalization, row normalization, and overall normalization.

In this embodiment, different normalization processing methods may be used based on an actual situation, to further improve flexibility of this solution.

In an example embodiment of this application, the normalization processing method may be predefined, or the normalization processing method may be determined by using signaling, and the signaling is RRC signaling or MAC CE signaling.

In this embodiment, the used normalization processing method may be determined in different manners, to further improve flexibility of this solution. In addition, because the terminal device and the network device may use a same normalization processing method, the normalization processing method is determined, so that the network device can restore channel information with relatively high accuracy.

According to a second aspect, this application provides another information transmission method. The method may be performed by a network device, or may be performed by a chip disposed in a network device. This is not limited in this application. The method includes: Each network device that provides a service for a terminal device may receive CSI sent by the terminal device, and the CSI includes R pieces of first information obtained through quantization processing, or the CSI includes R pieces of first information obtained through quantization processing and R pieces of second information obtained through quantization processing. Specifically, a manner of obtaining the first information obtained through quantization processing and the second information obtained through quantization processing, and a manner of obtaining first information and second information are similar to those in the first embodiment, and details are not described herein again. Further, the network device obtains target channel information based on the CSI, where the target channel information includes small-scale information corresponding to the network device and large-scale information corresponding to the network device.

In this embodiment, the network device obtains, based on the CSI, the small-scale information and the large-scale information in the channel information corresponding to the network device, to improve a performance gain, thereby reducing a performance loss.

In an example embodiment of this application, the channel information is information in at least one frequency domain unit. The frequency domain unit may be at least one RE, at least one RB, or at least one subband.

In this embodiment, the channel information is refined as information in a plurality of frequency domain units, and the first information is further quantized to provide a frequency domain beam resource. In addition, the frequency domain unit may be a plurality of different units, thereby improving flexibility of this solution.

In an example embodiment of this application, the first information includes a first space domain beam set, a first frequency domain beam set, and a first weighting coefficient set. In addition, the first information obtained through quantization processing includes a second space domain beam set, a second frequency domain beam set, and a second weighting coefficient set. The second space domain beam set is a subset of the first space domain beam set, the second frequency domain beam set is a subset of the first frequency domain beam set, and the second weighting coefficient set is obtained through quantization is performed on a subset of the first weighting coefficient set.

It should be understood that the first information obtained through quantization processing includes the second space domain beam set and the second frequency domain beam set. The second space domain beam set and the second frequency domain beam set may be directly fed back, or may be fed back by using a parameter index, for example, a PMI. Therefore, when one piece of CSI includes a plurality of channel measurement resources, the network device receives and obtains each piece of channel information based on a sequence.

In addition, after obtaining a second weighting coefficient set, the network device may determine a location of a non-zero weighting coefficient by using a bitmap, and then obtain a result of quantizing a submatrix determined by using a second space domain beam set and a second frequency domain beam set. Specifically, bit quantization described in this embodiment of this application is to quantize each weighting coefficient in the subset of the first weighting coefficient set by using N bits.

In this embodiment, the second space domain beam set is a subset of the first space domain beam set, the second frequency domain beam set is a subset of the first frequency domain beam set, and the second weighting coefficient set is obtained by quantizing a subset of the first weighting coefficient set. In this process, a quantity of space domain beams may be jointly selected, so as to resolve a problem that space domain sparseness of channels between network devices is different. In addition, a quantity of frequency domain beams may be jointly selected, so as to resolve a problem that frequency domain sparseness of channels between network devices is different. In addition, a quantity of weighting coefficients is jointly selected, so as to resolve a problem that different network devices require different quantities of weighting coefficients due to different large-scale information or different channel sparseness.

In an example embodiment of this application, the network device sends channel measurement configuration information, where the channel measurement configuration information is used for determining a maximum value of a total quantity of space domain beams in R second space domain beam sets; or the network device sends channel measurement configuration information, where the channel measurement configuration information is used for determining a maximum value of a quantity of space domain beams in each second space domain beam set, and one second space domain beam set corresponds to one maximum value of a quantity of space domain beams in the second space domain beam set.

In this embodiment, the channel measurement configuration information sent by the network device may further be used to determine the maximum value of the quantity of space domain beams, so that the terminal device can determine the maximum value in different manners, to improve flexibility of this solution, and jointly determines the quantity of space domain beams in the R second space domain beam sets.

In an example embodiment of this application, the channel measurement configuration information includes a first space domain beam value, the first space domain beam value is used for obtaining the maximum value of the total quantity of space domain beams in the R second space domain beam sets, and the first space domain beam value may be an integer or a proportional coefficient. Alternatively, the channel measurement configuration information includes a second space domain beam value, where the second space domain beam value is used for obtaining the maximum value of the quantity of space domain beams in the second space domain beam set. The second space domain beam value may be an integer or a proportional coefficient.

In this embodiment, the channel measurement configuration information may include the first space domain beam value, and the maximum value of the total quantity of space domain beams in the R second space domain beam sets is obtained by using the first space domain beam value. Similarly, the channel measurement configuration information may further include the second space domain beam value, and the maximum value of the quantity of space domain beams in each second space domain beam set may be obtained by using the second space domain beam value, thereby further improving feasibility of this solution. In addition, the maximum value may be obtained through direct determining or indirect calculation, and therefore, flexibility of determining the maximum value of the quantity of space domain beams is improved.

In an example embodiment of this application, the total quantity of space domain beams in the R second space domain beam sets obtained through quantization processing is less than or equal to the maximum value of the total quantity of space domain beams in the R second space domain beam sets. Alternatively, the quantity of space domain beams in the second space domain beam set is less than or equal to the corresponding maximum value of the quantity of space domain beams in the second space domain beam set.

In this embodiment, a quantity of space domain beams obtained through quantization and joint selection is reduced, that is, a quantity of space domain beams included in the CSI is reduced. Therefore, overheads for reporting the CSI by the terminal device are reduced, and overheads for obtaining channel information in the CSI by the network device are reduced.

In an example embodiment of this application, the network device sends channel measurement configuration information, where the channel measurement configuration information is used for determining a maximum value of a total quantity of frequency domain beams in R second frequency domain beam sets; or the network device sends channel measurement configuration information, where the channel measurement configuration information is used for determining a maximum value of a quantity of frequency domain beams in each second frequency domain beam set, and one second frequency domain beam set corresponds to one maximum value of a quantity of frequency domain beams in the second frequency domain beam set.

In this embodiment, the channel measurement configuration information sent by the network device may further be used to determine a maximum value of a quantity of frequency domain beams, so that the terminal device can determine a maximum value in different manners, to improve flexibility of this solution, and jointly determine a quantity of frequency domain beams in the R second frequency domain beam sets, thereby improving feasibility of this solution.

In an example embodiment of this application, the channel measurement configuration information includes a first frequency domain beam value, the first frequency domain beam value is used for obtaining the maximum value of the total quantity of frequency domain beams in the R second frequency domain beam sets, and the first frequency domain beam value may be an integer or a proportional coefficient. Alternatively, the channel measurement configuration information includes a second frequency domain beam value, where the second frequency domain beam value is used for obtaining the maximum value of the quantity of frequency domain beams in the second frequency domain beam set. The second frequency domain beam value may be an integer or a proportional coefficient.

In this embodiment, the channel measurement configuration information may include the first frequency domain beam value or the second frequency domain beam value, to determine a maximum value of a quantity of frequency domain beams in different cases. Therefore, flexibility of this solution is improved. In addition, the maximum value may be further obtained through direct determining or indirect calculation, thereby further improving flexibility of determining the maximum value of the quantity of frequency domain beams.

In an example embodiment of this application, the quantity of frequency domain beams in the R second frequency domain beam sets obtained through quantization processing is less than or equal to the maximum value of the total quantity of frequency domain beams in the R second frequency domain beam sets. Alternatively, the quantity of frequency domain beams in the second frequency domain beam set obtained through quantization processing is less than or equal to the maximum value of the quantity of frequency domain beams in the corresponding second frequency domain beam set.

In this embodiment, a quantity of frequency domain beams obtained through quantization and joint selection is reduced, that is, a quantity of frequency domain beams included in the CSI is reduced. Therefore, overheads for reporting the CSI by the terminal device are reduced, and overheads for obtaining channel information in the CSI by the network device are reduced.

In an example embodiment of this application, the network device sends channel measurement configuration information, where the channel measurement configuration information is used for determining a maximum value of a total quantity of weighting coefficients in R second weighting coefficient sets; or the network device sends channel measurement configuration information, where the channel measurement configuration information is used for determining a maximum value of a quantity of weighting coefficients in each second weighting coefficient set, and one second weighting coefficient set corresponds to one maximum value of a quantity of weighting coefficients in the second weighting coefficient set.

In this embodiment, the channel measurement configuration information sent by the network device may further be used to determine a maximum value of a quantity of weighting coefficients, so that the terminal device can determine the maximum value in different manners, to improve flexibility of this solution, and jointly determine a quantity of weighting coefficients in the R second weighting coefficient sets, thereby improving feasibility of this solution.

In an example embodiment of this application, the channel measurement configuration information includes a first weighting coefficient value, the first weighting coefficient value is used for obtaining the maximum value of the total quantity of weighting coefficients in the R second weighting coefficient sets, and the first weighting coefficient value may be an integer or a proportional coefficient. Alternatively, the channel measurement configuration information includes a second weighting coefficient value, the second weighting coefficient value is used for obtaining the maximum value of the quantity of weighting coefficients in the second weighting coefficient set, and the second weighting coefficient value may be an integer or a proportional weighting coefficient.

In this embodiment, the channel measurement configuration information may include the first weighting coefficient value or the second weighting coefficient value, and a maximum value of a quantity of weighting coefficients in different cases is determined, thereby improving flexibility of this solution. In addition, the maximum value may be obtained through direct determining or indirect calculation, thereby further improving flexibility of determining the maximum value of the quantity of weighting coefficients.

In an example embodiment of this application, the total quantity of weighting coefficients in the R second weighting coefficient sets obtained through quantization processing is less than or equal to the maximum value of the quantity of weighting coefficients in the R second weighting coefficient sets. Alternatively, the quantity of weighting coefficients in the second weighting coefficient set obtained through quantization processing is less than or equal to the maximum value of the quantity of weighting coefficients in the corresponding second weighting coefficient set.

In this embodiment, a quantity of weighting coefficients obtained through quantization and joint selection is reduced, that is, a quantity of weighting coefficients included in the CSI is reduced. Therefore, overheads for reporting the CSI by the terminal device are reduced, and overheads for obtaining channel information in the CSI by the network device are reduced.

In an example embodiment of this application, quantization processing may be performed on the first weighting coefficient set in two manners. In one manner, a weighting coefficient is determined from subsets of the R first weighting coefficient sets as a first reference weighting coefficient, and the first reference weighting coefficient is a weighting coefficient with a largest amplitude in the subsets of the R first weighting coefficient sets. In other words, the first reference weighting coefficient is set to 1 as a quantization reference, then quantization processing is performed on relative amplitudes and relative phases between all weighting coefficients in the R weighting coefficient sets and the first reference weighting coefficient, to obtain the R second weighting coefficient sets. In the other manner, R second reference weighting coefficients are determined in subsets of the R first weighting coefficient sets, where a subset of one first weighting coefficient set corresponds to one second reference weighting coefficient, and the second reference weighting coefficient is a weighting coefficient with a largest amplitude in the subset of the corresponding first weighting coefficient set. That is, the second reference weighting coefficient is set to 1 as a quantization reference, then a second reference weighting coefficient is determined in the R second reference weighting coefficients as a third reference weighting coefficient, then quantization processing is performed on relative amplitudes and relative phases between the R weighting coefficient sets and the corresponding second reference weighting coefficients, and quantization processing is performed on relative amplitudes and relative phases between the R second reference weighting coefficients and the third reference weighting coefficient, to obtain the R second weighting coefficient sets.

In this embodiment, a relative relationship between small-scale information of channel information of different network devices is calculated in different manners, to improve accuracy of an obtained second weighting coefficient set, so that a corresponding network device can accurately obtain channel information after obtaining the second weighting coefficient set, thereby reducing a performance loss.

In an example embodiment of this application, the third reference weighting coefficient may be a second reference weighting coefficient with a largest amplitude in the R second reference weighting coefficients, or a second reference weighting coefficient with a smallest amplitude in the R second reference weighting coefficients; or a second reference weighting coefficient corresponding to a network device initially accessed by the terminal device is the third reference weighting coefficient; or a second reference weighting coefficient corresponding to a cell initially accessed by the terminal device is the third reference weighting coefficient; or a second reference weighting coefficient corresponding to any network device is the third reference weighting coefficient; a second reference weighting coefficient corresponding to a weighting coefficient set of a network device with a smallest identifier is the third reference weighting coefficient; or a second reference weighting coefficient corresponding to a weighting coefficient set of a network device with a largest identifier is the third reference weighting coefficient.

In this embodiment, the third reference weighting coefficient is determined in different manners, so that flexibility of this solution can be further improved.

In an example embodiment of this application, quantization processing may be performed on the second information in two manners. To ensure a relative value of energy between a plurality of pieces of channel information, one manner is to determine one piece of second information from the R pieces of second information as reference information, that is, the reference information is set to 1 as a quantization reference, and then quantization processing is performed on relative values between the R pieces of second information and the reference information, to obtain the R pieces of second information obtained through quantization processing. In addition, to improve accuracy of fed-back downlink large-scale information and improve performance, the other manner is to determine one piece of second information from the R pieces of second information as reference information, that is, set the reference information to 1 as a quantization reference, then perform quantization processing on relative values between the R pieces of second information and the reference information, and perform quantization processing on an absolute value of the reference information, to obtain the R pieces of second information obtained through quantization processing.

In this embodiment, a relative relationship between large-scale information in channel information of different network devices is calculated in different manners, to improve accuracy of second information obtained through quantization processing, so that a corresponding network device can accurately obtain channel information after obtaining the second information obtained through quantization processing, thereby reducing a performance loss.

In an example embodiment of this application, the reference information may be second information with a largest value in the R pieces of second information, or a second reference weighting coefficient with a smallest amplitude in the R second reference weighting coefficients; or a second reference weighting coefficient corresponding to an initially accessed cell of the terminal device is the third reference weighting coefficient; or a second reference weighting coefficient corresponding to any network device is the third reference weighting coefficient; or second information of an initially accessed network device is the reference information; or a second reference weighting coefficient corresponding to a weighting coefficient set of a network device with a smallest identifier is the third reference weighting coefficient; or second information corresponding to a weighting coefficient set of a network device with a largest identifier is the reference information.

In this embodiment, the reference information is determined in different manners, so that flexibility of this solution can be further improved.

In an example embodiment of this application, the CSI includes the R pieces of first information obtained through quantization processing. Therefore, the network device may measure an uplink sounding reference signal SRS to obtain uplink large-scale information, and then obtain the target channel information based on the R pieces of first information obtained through quantization processing and the uplink large-scale information.

In this embodiment, the obtained uplink large-scale information is equivalent to the second information obtained through quantization processing, so that corresponding channel information is obtained, thereby improving accuracy of obtaining the channel information.

In an example embodiment of this application, the normalization processing method includes at least one of the following: column normalization, row normalization, and overall normalization.

In this embodiment, different normalization processing methods may be used based on an actual situation, to further improve flexibility of this solution.

In an example embodiment of this application, the normalization processing method may be predefined. For example, the predefined normalization processing method is overall normalization. In this case, the terminal device performs overall normalization processing on the channel information, and the network device also uses the overall normalization method when restoring the channel information. Alternatively, the normalization processing method may be determined by using signaling, and the signaling is RRC signaling or MAC CE signaling.

According to a third aspect, a communication apparatus is provided. The communication apparatus has some or all functions of implementing the terminal device in any one of the first aspect and the possible embodiments of the first aspect. For example, functions of the apparatus may include functions in some or all of the embodiments of the terminal device in this application, or may have a function of independently implementing any embodiment of this application. The function may be implemented by hardware, or may be implemented by hardware executing corresponding software. The hardware or the software includes one or more units or modules corresponding to the functions.

In a possible embodiment, a structure of the communication apparatus may include a processing module and a transceiver module. The processing module is configured to support the communication apparatus in performing a corresponding function in the foregoing method. The transceiver module is configured to support communication between the communication apparatus and another device. The communication apparatus may further include a storage module. The storage module is configured to couple to the processing module and the communication module, and stores a program instruction and data that are utilized for the communication apparatus.

In an embodiment, the communication apparatus includes:
  a processing module, configured to obtain R pieces of channel information, where the channel information includes large-scale information and small-scale information, and R is an integer greater than or equal to 1; where
  the processing module is further configured to perform normalization processing on the R pieces of channel information to obtain R pieces of first information and R pieces of second information, where the first information is small-scale information obtained through normalization processing, and the second information is large-scale information obtained through normalization processing; and
  a transceiver module, configured to send channel state information CSI, where the CSI includes R pieces of first information obtained through quantization processing, or R pieces of first information obtained through quantization processing and R pieces of second information obtained through quantization processing.

For related content of this embodiment, refer to the related content of the first aspect. Details are not described herein again.

In an example, the processing module may be a processor or a processing unit, the transceiver module may be a transceiver, a communication interface, or a communication unit, and the storage module may be a memory or a storage unit.

In another embodiment, the communication apparatus may include:
  a processor, configured to obtain R pieces of channel information, where the channel information includes large-scale information and small-scale information, and R is an integer greater than or equal to 1; where
  the processor is further configured to perform normalization processing on the R pieces of channel information to obtain R pieces of first information and R pieces of second information, where the first information is small-scale information obtained through normalization processing, and the second information is large-scale information obtained through normalization processing; and
  a transceiver, configured to send channel state information CSI, where the CSI includes R pieces of first information obtained through quantization processing, or R pieces of first information obtained through quantization processing and R pieces of second information obtained through quantization processing.

For related content of this embodiment, refer to the related content of the first aspect. Details are not described herein again.

In an example process, the processor may be configured to perform, for example, but not limited to, baseband related processing; and the transceiver may be configured to perform, for example, but not limited to, radio frequency receiving and sending. The foregoing components may be separately disposed on chips that are independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, an increasing quantity of components may be integrated onto a same chip. For example, a digital baseband processor and a plurality of application processors (including but not limited to a graphics processing unit, a multimedia processor, and the like) may be integrated onto a same chip. Such a chip may be referred to as a system on chip. Whether the components are separately disposed on different chips or integrated and disposed on one or more chips usually depends on a requirement of a product embodiment. Implementation forms of the foregoing components are not limited in this embodiment of this application.

According to a fourth aspect, a communication apparatus is provided. The communication apparatus includes a processor. The processor is coupled to a memory, and may be configured to execute instructions in the memory, to implement the method according to any one of the possible embodiments of the first aspect. In some embodiments, the communication apparatus further includes the memory. In some embodiments, the communication apparatus further includes a communication interface. The processor is coupled to the communication interface. The communication interface is configured to input and/or output information. The information includes at least one of instructions and data.

In an embodiment, the communication apparatus is a terminal device. When the communication apparatus is the terminal device, the communication interface may be a transceiver or an input/output interface.

In some embodiments, the transceiver may be a transceiver circuit. In some embodiments, the input/output interface may be an input/output circuit.

In another embodiment, the communication apparatus is a chip or a chip system disposed in a terminal device. When the communication apparatus is the chip or the chip system disposed in the terminal device, the communication interface may be an input/output interface, an interface circuit, an output circuit, an input circuit, a pin, a related circuit, or the like. The processor may alternatively be embodied as a processing circuit or a logic circuit.

According to a fifth aspect, a communication apparatus is provided. The communication apparatus has some or all functions of implementing the network device in any one of the second aspect and the possible embodiments of the second aspect. For example, a function of the apparatus may include functions in some or all embodiments of the network device in this application, or may include a function of separately implementing any one of the embodiments of this application. The function may be implemented by hardware, or may be implemented by hardware executing corresponding software. The hardware or the software includes one or more units or modules corresponding to the functions.

In a possible embodiment, a structure of the communication apparatus may include a processing module and a transceiver module. The processing module is configured to support the communication apparatus in performing a corresponding function in the foregoing method. The transceiver module is configured to support communication between the communication apparatus and another device. The communication apparatus may further include a storage module. The storage module is configured to couple to the processing module and the communication module, and stores a program instruction and data that are utilized for the communication apparatus.

In an embodiment, the communication apparatus includes:
  a transceiver module, configured to receive channel state information CSI, where the CSI includes R pieces of first information obtained through quantization processing, or R pieces of first information obtained through quantization processing and R pieces of second information obtained through quantization processing, the first information is small-scale information obtained through normalization processing, the second information is large-scale information obtained through normalization processing, the small-scale information and the large-scale information belong to channel information, and R is an integer greater than or equal to 1; and
  a processing module, configured to obtain, by the network device, target channel information based on the CSI, where the target channel information includes small-scale information corresponding to the network device and large-scale information corresponding to the network device.

For related content of this embodiment, refer to the related content of the second aspect. Details are not described herein again.

In an example, the processing module may be a processor or a processing unit, the transceiver module may be a transceiver, a communication interface, or a communication unit, and the storage module may be a memory or a storage unit.

In another embodiment, the communication apparatus may include:
  a transceiver, configured to receive channel state information CSI, where the CSI includes R pieces of first information obtained through quantization processing, or R pieces of first information obtained through quantization processing and R pieces of second information obtained through quantization processing, the first information is small-scale information obtained through normalization processing, the second information is large-scale information obtained through normalization processing, the small-scale information and the large-scale information belong to channel information, and R is an integer greater than or equal to 1; and
  a processor, configured to obtain, by the network device, target channel information based on the CSI, where the target channel information includes small-scale information corresponding to the network device and large-scale information corresponding to the network device.

For related content of this embodiment, refer to the related content of the second aspect. Details are not described herein again.

According to a sixth aspect, a communication apparatus is provided. The communication apparatus includes a processor. The processor is coupled to a memory, and may be configured to execute instructions in the memory, to implement the method according to any one of the possible embodiments of the second aspect. In some embodiments, the communication apparatus further includes the memory. In some embodiments, the communication apparatus further includes a communication interface. The processor is coupled to the communication interface. The communication interface is configured to input and/or output information. The information includes at least one of instructions and data.

In an embodiment, the communication apparatus is a network device. When the communication apparatus is the network device, the communication interface may be a transceiver or an input/output interface.

In some embodiments, the transceiver may be a transceiver circuit. In some embodiments, the input/output interface may be an input/output circuit.

In another embodiment, the communication apparatus is a chip or a chip system disposed in a network device. When the communication apparatus is the chip or the chip system disposed in the network device, the communication interface may be an input/output interface, an interface circuit, an output circuit, an input circuit, a pin, a related circuit, or the like. The processor may alternatively be embodied as a processing circuit or a logic circuit.

According to a seventh aspect, a processor is provided. The processor includes an input circuit, an output circuit, and a processing circuit. The processing circuit is configured to receive a signal by using the input circuit, and transmit a signal by using the output circuit, to enable the processor to perform the method according to any one of the possible embodiments of the first aspect and the second aspect.

In some embodiments, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific embodiments of the processor and the various circuits are not limited in embodiments of this application.

According to an eighth aspect, a communication apparatus is provided, including a communication interface and a processor. The communication interface is coupled to the processor. The communication interface is configured to input and/or output information. The information includes at least one of instructions and data. The processor is configured to execute a computer program, so that the communication apparatus performs the method in any one of the possible embodiments of the first aspect and the second aspect.

In some embodiments, there are one or more processors, and there are one or more memories.

According to a ninth aspect, a communication apparatus is provided, including a processor and a memory. The processor is configured to: read instructions stored in the memory, receive a signal by using a receiver, and transmit a signal by using a transmitter, so that the apparatus performs the method in any one of the possible embodiments of the first aspect and the second aspect.

In some embodiments, there are one or more processors, and there are one or more memories.

In some embodiments, the memory may be integrated with the processor, or the memory and the processor are separately disposed.

In an example process, the memory may be a non-transitory memory, such as a read-only memory (ROM). The memory and the processor may be integrated into one chip, or may be disposed in different chips respectively. A type of the memory and a manner in which the memory and the processor are disposed are not limited in this embodiment of this application.

It should be understood that in a related information exchange process, for example, sending indication information may be a process of outputting the indication information from the processor, and receiving the indication information may be a process of inputting the received indication information to the processor. Specifically, the information output by the processor may be output to the transmitter, and the input information received by the processor may be from the receiver. The transmitter and the receiver may be collectively referred to as a transceiver.

The communication apparatus in the eighth aspect and the ninth aspect may be a chip. The processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor, may be located outside the processor, or may exist independently.

According to a tenth aspect, a computer program product is provided. The computer program product includes a computer program (which may also be referred to as code or an instruction). When the computer program is run, a computer is enabled to perform the method according to any one of the possible embodiments of the first aspect and the second aspect.

According to an eleventh aspect, a computer-readable storage medium is provided. The computer-readable storage medium stores a computer program (also referred to as code or an instruction). When the computer program is run on a computer, the computer is enabled to perform the method according to any one of the possible embodiments of the first aspect and the second aspect.

According to a twelfth aspect, a communication system is provided. The communication system includes the foregoing terminal device and network device.

According to a thirteenth aspect, this application provides a chip system. The chip system includes a processor and an interface. The interface is configured to obtain a program or instructions. The processor is configured to invoke the program or the instructions to implement or support a terminal device in implementing a function in the first aspect, for example, determining or processing at least one of data and information in the foregoing method.

In a possible embodiment, the chip system further includes a memory. The memory is configured to store program instructions and data that are utilized for the terminal device. The chip system may include a chip, or may include a chip and another discrete component.

According to a fourteenth aspect, this application provides a chip system. The chip system includes a processor and an interface. The interface is configured to obtain a program or instructions. The processor is configured to invoke the program or the instructions to implement or support a network device in implementing a function in the second aspect, for example, determining or processing at least one of data and information in the foregoing method.

In a possible embodiment, the chip system further includes a memory. The memory is configured to store program instructions and data that are utilized for the network device. The chip system may include a chip, or may include a chip and another discrete component.

It should be noted that advantageous effects brought by the embodiments of the third aspect to the twelfth aspect of this application may be understood with reference to the embodiments of the first aspect and the second aspect. Therefore, details are not repeated.

BRIEF DESCRIPTION OF DRAWINGS

FIG. 1 is a schematic diagram of a system framework according to an embodiment of this application;

FIG. 3 is a schematic diagram of an embodiment of an information transmission method according to an embodiment of this application;

FIG. 4 is a schematic diagram of another embodiment of an information transmission method according to an embodiment of this application;

DESCRIPTION OF EMBODIMENTS

Figure 2:
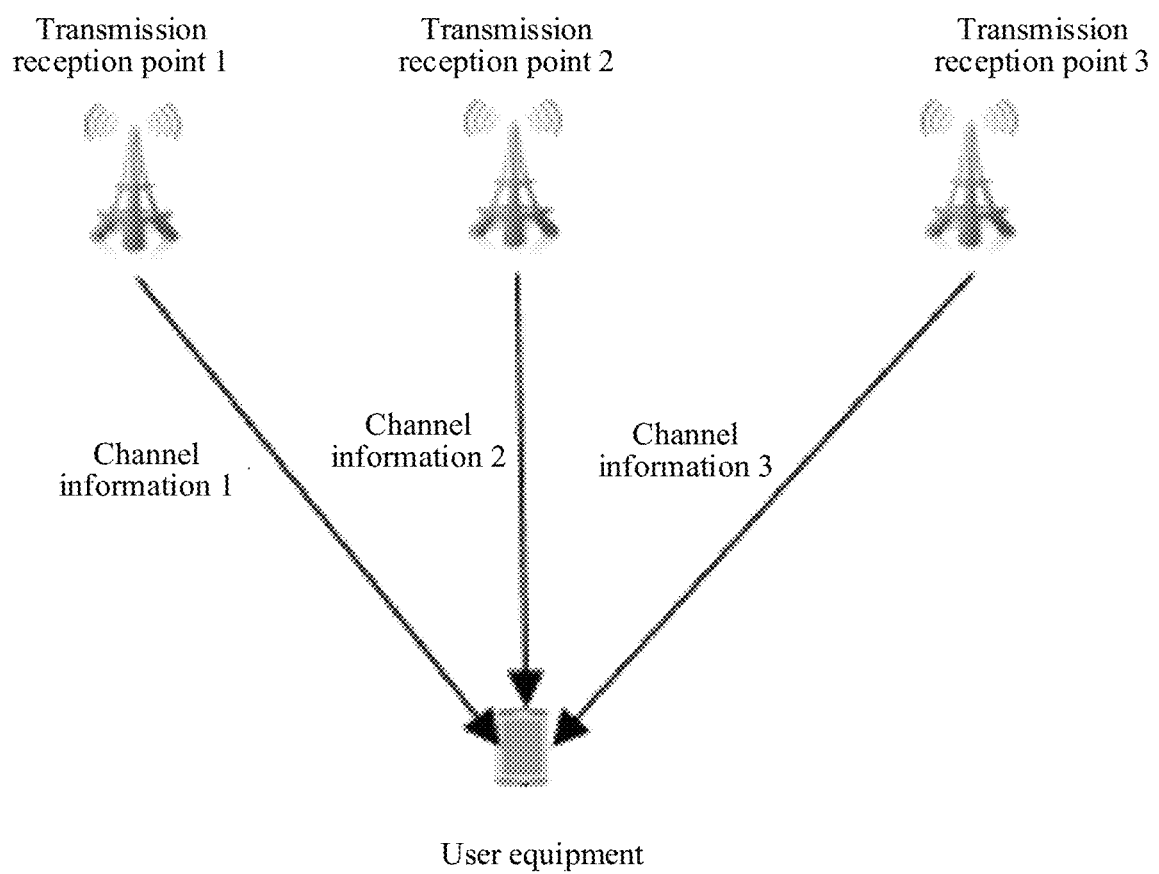
FIG. 2 is a schematic diagram of multi-station coordination based on coherent joint transmission according to an embodiment of this application.

The following describes technical solutions of this application with reference to accompanying drawings.

The technical solutions in embodiments of this application may be applied to various communication systems, for example, a long term evolution (LTE) system, an LTE frequency division duplex (FDD) system, an LTE time division duplex (TDD) system, and a universal mobile telecommunications system (UMTS). With continuous development of a communication system, technical solutions in this application may be applied to a 5th generation (5G) system or a new radio (NR) system, and may be applied to a future network, such as a 6G system or even a future system; or may be applied to a device to device (D2D) system, a machine to machine (M2M) system, and the like.

It should be understood that a network device in the communication system may be any device having a wireless transceiver function or a chip that can be disposed in the device. The device includes but is not limited to: an evolved NodeB (eNB), a radio network controller (RNC), a NodeB (NB), a base station controller (BSC), a base transceiver station (BTS), a home base station (for example, a Home evolved NodeB, or Home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like, or may be a device used in a 5G system, a 6G system, or even a future system, for example, a gNB in an NR system, or a transmission point (TRP or TP), or may be one or a group (including a plurality of antenna panels) of antenna panels of a base station in a 5G system, or may be a network node that forms a gNB or a transmission point, for example, a baseband unit (BBU), a distributed unit (DU), a pico cell (Picocell), a femto cell (Femtocell), vehicle to everything (V2X), or a road side unit (RSU) in an intelligent driving scenario.

In some deployments, a gNB may include a central unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (packet data convergence protocol, PDCP) layer, and the DU implements functions of a radio link control (RLC) layer, a media access control (MAC) layer, and a physical layer (PHY). Information at the RRC layer eventually becomes information at the PHY layer, or is converted from the information at the PHY layer. Therefore, in the architecture, higher layer signaling such as RRC layer signaling or PHCP layer signaling may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

In the embodiments disclosed in this application, an apparatus configured to implement network device functions may be a network device, or may be an apparatus that can support the network device in implementing the functions, for example, a chip system. The apparatus may be installed in the network device.

It should be further understood that a terminal device in the communication system may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in embodiments of this application may be a mobile phone, a tablet computer (Pad), a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, a wireless terminal in the foregoing V2X Internet of Vehicles, an RSU of a wireless terminal type, or the like. An application scenario is not limited in embodiments of this application.

In addition, to facilitate understanding of embodiments of this application, the following several descriptions are provided.

First, in this application, for ease of description, when numbering is involved, consecutive numbering may start from 0. For example, the $0^{th}$ symbol in a slot may be an initial symbol in the slot. Certainly, a specific implementation is not limited thereto. For example, consecutive numbering may alternatively start from 1. For example, the first symbol in a slot may also be an initial symbol in the slot. Because start values of numbers are different, numbers corresponding to a same symbol in a slot are also different.

It should be understood that the foregoing descriptions are all provided to help describe the technical solutions provided in embodiments of this application, but are not intended to limit the scope of this application.

Second, in the embodiments shown below, for a type of technical feature, "first", "second", "third", and the like are used to distinguish technical features in the type of technical feature, and there is no order of precedence or magnitude between the technical features described by "first", "second", and "third".

Third, "at least one" indicates one or more, and "a plurality of" indicates two or more. A term "and/or" describes an association relationship between associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, and c may represent: a, b, c, a and b, a and c, b and c, or a, b, and c, where a, b, and c each may be singular or plural.

Fourth, in the embodiments shown below, some scenarios are described by using an NR network scenario in a wireless communication network as an example. It should be noted that the solutions disclosed in embodiments of this application may be further applied to another wireless communication network, and a corresponding name may also be replaced with a name of a corresponding function in the another wireless communication network.

Fifth, the embodiments disclosed in this application present aspects, embodiments, or features of this application around a system including a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

Sixth, in the embodiments disclosed in this application, "of", "relevant", and "corresponding" may be interchangeably used sometimes. It should be noted that, when a difference of these expressions is not emphasized, meanings of these expressions are consistent.

To better understand the information transmission method, the apparatus, and the device that are disclosed in embodiments of this application, a system architecture of a communication system used in embodiments of this application is first described. This application may be used in a communication system including one base station and a plurality of UEs, or may be used in a communication system including a plurality of base stations and a plurality of UEs. Based on this, FIG. 1 is a schematic diagram of a system framework according to an embodiment of this application. As shown in FIG. 1, in (A) in FIG. 1, a base station and UE 1 to UE 6 form a communication system. The base station may include one or more panels. In the communication system, the UE 1 to the UE 6 send uplink data to the base station, and the base station may receive the uplink data sent by the UE 1 to the UE 6. In addition, the UE 4 to the UE 6 may form a communication system. Therefore, in the communication system, the base station may send downlink data to the UE 1, the UE 2, and the UE 5, and the base station may receive uplink data sent by the UE 1, the UE 2, and the UE 5. In the communication system including the UE 4 to the UE 6, the UE 5 sends downlink data to the UE 4 and the UE 6, and the UE 5 may receive uplink information sent by the UE 4 and the UE 6. In addition, in (B) in FIG. 1, a base station 1 to a base station 3 and UE 1 to UE 3 may form a communication system, and the base station 1 to the base station 3 all serve the UE 2.

It can be learned from (B) in FIG. 1 that, in this application, multi-station coordination manners may be used to serve a user. For example, coherent joint transmission (CJT) is one of the transmission manners. Based on this, FIG. 2 is a schematic diagram of multi-station coordination based on coherent joint transmission according to an embodiment of this application. As shown in the figure, TRPs are base stations that provide services for UE, a network device 1, a network device 2, and a network device 3 all serve the UE, and transmitted data uses a same demodulation reference signal (DMRS) port. Then, the network device 1 transmits channel information 1 (H1) to the UE, the network device 2 transmits channel information 2 (H2) to the UE, and the network device 3 transmits channel information 3 (H3) to the UE. In a coherent joint transmission manner, the UE equivalently considers the network device 1, the network device 2, and the network device 3 as a base station formed by the network device 1, the network device 2, and the network device 3. Therefore, the UE considers H1 to H3 as channel information transmitted by one base station. The network device described in this embodiment may also be a plurality of antenna panels deployed in the network device.

Further, when a multiple-input multiple-output (MIMO) technology is used, that is, when a base station sends data to UE, modulation and coding, and signal precoding may be performed. How to send data to the UE depends on CSI fed back by the UE to the base station. In a time division duplex (TDD) system, because an uplink channel and a downlink channel use a same bandwidth, the uplink channel and the downlink channel have reciprocity. A base station may obtain CSI of the downlink channel by using the reciprocity between the uplink channel and the downlink channel, to perform signal precoding. However, in a frequency division duplex (FDD) system, because an interval between an uplink frequency band and a downlink frequency band is far greater than a coherence bandwidth, uplink and downlink channels do not have complete reciprocity, and a base station cannot directly use uplink channel information to perform accurate downlink precoding. Therefore, in the FDD system, the base station may rely on CSI fed back by UE to the base station. Because there is a phase difference for each TRP, sparseness between each TRP and UE is different, and importance of CSI fed back by a terminal to a TRP is also different, feeding back, by the UE, a same quantity of space domain beams, a same quantity of frequency domain beams, and a same quantity of weighting coefficients to different TRPs increases a performance loss.

To resolve the foregoing problem, an embodiment of this application provides an information transmission method, to feed back different large-scale information and small-scale information to different network devices, so as to reduce a performance loss.

The following first describes in detail an information transmission method used in embodiments of this application by using a terminal device as an execution body. FIG. 3 is a schematic diagram of an embodiment of the information transmission method according to an embodiment of this application. The information transmission method includes the following operations.

S101: The terminal device obtains R pieces of channel information, where the channel information includes large-scale information and small-scale information, and R is an integer greater than or equal to 1.

In this embodiment, the terminal device may receive CSI-RSs respectively corresponding to R network devices, and then measure the CSI-RSs respectively corresponding to the R network devices, to obtain R pieces of channel information corresponding to the network devices. Each piece of channel information includes large-scale information and small-scale information, where R is an integer greater than or equal to 1. Specifically, the channel information is information in at least one frequency domain unit. The frequency domain unit may be at least one RE, at least one RB, or at least one subband.

For example, based on the manner of performing multi-station coordination based on coherent joint transmission described in FIG. 2, that is, three network devices serve the terminal device, the terminal device may obtain CSI-RSs respectively corresponding to the three network devices, and measure the CSI-RSs respectively corresponding to the three network devices, to obtain channel information corresponding to the three network devices. Because each piece of channel information includes large-scale information and small-scale information, if the three network devices are a network devices 1, a network device 2, and a network device 3, the terminal device may obtain channel information 1 (H1) that includes large-scale information 1 and small-scale information 1 and that is corresponding to the network device 1, channel information 2 (H2) that includes large-scale information 2 and small-scale information 2 and that is corresponding to the network device 2, and channel information 3 (H3) that includes large-scale information 3 and small-scale information 3 and that is corresponding to the network device 3. It should be understood that the foregoing example is merely used to understand this embodiment of this application, a value of R should be flexibly determined based on a situation of network devices that provide services for the terminal device.

S102: The terminal device performs normalization processing on the R pieces of channel information to obtain R pieces of first information and R pieces of second information, where the first information is small-scale information obtained through normalization processing, and the second information is large-scale information obtained through normalization processing.

In this embodiment, the terminal device performs normalization processing on the R pieces of channel information obtained in operation S101, to obtain R pieces of first information that are in a one-to-one correspondence with the channel information and R pieces of second information that are in a one-to-one correspondence with the channel information. The first information is small-scale information obtained through normalization processing, and the second information is large-scale information obtained through normalization processing.

Specifically, Formula (1) may be used to describe a relationship between the channel information, the first information, and the second information:

$$H_i = \alpha_i \tilde{H}_i; \quad (1)$$

herein, $H_i$ indicates channel information corresponding to a network device i, $\alpha_i$ indicates second information corresponding to $H_i$, and $\tilde{H}_i$ indicates first information corresponding to $H_i$.

For example, an example in which three network devices serve the terminal device is used for description. The three network devices are a network device 1, a network device 2, and a network device 3. The terminal device may obtain channel information 1 corresponding to the network device 1, channel information 2 corresponding to the network device 2, and channel information 3 corresponding to the network device 3. Therefore, after normalization processing is performed on H1, H2, and H3, three pieces of first information and three pieces of second information may be obtained. Because the channel information is in a one-to-one correspondence with the first information, and the channel information is in a one-to-one correspondence with the second information, according to Formula (1), the following equation may be obtained:

$$\begin{bmatrix} H_1 \\ H_2 \\ H_3 \end{bmatrix} = \begin{bmatrix} \alpha_1 \tilde{H}_1 \\ \alpha_2 \tilde{H}_2 \\ \alpha_3 \tilde{H}_3 \end{bmatrix};$$

or the following equation may be obtained:

$$[H_1 H_2 H_3] = [\alpha_1 \tilde{H}_1 \alpha_2 \tilde{H}_2 \alpha_3 \tilde{H}_3].$$

In the foregoing two equations, $H_1$ indicates the channel information 1 corresponding to the network device 1, $H_2$ indicates the channel information 2 corresponding to the network device 2, and $H_3$ indicates the channel information 3 corresponding to the network device 3. $\alpha_1$ indicates second information corresponding to $H_1$, $\tilde{H}_1$ indicates the second information corresponding to $H_1$, $\alpha_2$ indicates second information corresponding to $H_2$, $\tilde{H}_2$ indicates first information corresponding to $H_2$, $\alpha_3$ indicates first information corresponding to $H_3$, and $\tilde{H}_3$ indicates the first information corresponding to $H_3$.

Specifically, the first information may include a first space domain beam set, a first frequency domain beam set, and a first weighting coefficient set.

Specifically, a method for performing normalization processing on the channel information includes but is not limited to column normalization, row normalization, or overall normalization. Column normalization indicates that total energy of each column of a channel is P, row normalization indicates that total energy of each row of the channel is P, and overall normalization indicates that total energy of the channel is P. The value of the total energy P may be 1, or may be any other value. For example, the value of P is a quantity of transmit antennas, or a quantity of transmit ports, or a quantity of receive antennas, or a quantity of receive ports, or a product of a quantity of transmit antennas and a quantity of receive antennas, or a product of a quantity of transmit ports and a quantity of receive ports.

In some embodiments, the terminal device and the network device may use a same normalization processing method, so that the network device can restore channel information with relatively high accuracy. Therefore, the normalization processing method may be predefined. For example, the predefined normalization processing method is overall normalization. In this case, the terminal device performs overall normalization processing on channel information, and the network device also uses the overall normalization method when restoring the channel information. Alternatively, the normalization processing method may be determined by using signaling, and the signaling is RRC signaling or MAC CE signaling. For example, the network device notifies, by using RRC signaling, the terminal device that the normalization processing method is column normalization. In this case, the terminal device performs column normalization processing on channel information, and the network device also uses the column normalization method when restoring the channel information.

S103: The terminal device sends channel state information CSI, where the CSI includes R pieces of first information obtained through quantization processing, or R pieces of first information obtained through quantization processing and R pieces of second information obtained through quantization processing.

In this embodiment, the terminal device further performs quantization processing on the R pieces of first information and the R pieces of second information that are obtained in operation S102, to obtain the R pieces of first information obtained through quantization processing and the R pieces of second information obtained through quantization processing, and sends the CSI to the R network devices. In this case, the CSI may include the R pieces of first information obtained through quantization processing, or include the R pieces of first information obtained through quantization processing and the R pieces of second information obtained through quantization processing.

Specifically, it can be learned from the foregoing embodiment that, the first information includes the first space domain beam set, the first frequency domain beam set, and the first weighting coefficient set. Therefore, the first information obtained through quantization processing includes a second space domain beam set, a second frequency domain beam set, and a second weighting coefficient set. The second space domain beam set is a subset of the first space domain beam set, the second frequency domain beam set is a subset of the first frequency domain beam set, and the second weighting coefficient set is obtained through quantization of the first weighting coefficient set. In this embodiment, for the first space domain beam set, because the first space domain beam set is a set of all columns in a codebook, the second space domain beam set includes at least one column selected from all the columns. For example, if the first space domain beam set includes 10 columns, the second space domain beam set includes one, two, three, or more of the 10 columns. For the first frequency domain beam set, because the first space domain beam set is a set of all rows in the codebook, the second frequency domain beam set includes at least one row selected from all the columns. For example, if the first frequency domain beam set includes 10 rows, the second frequency domain beam set includes one, two, three, or more of the 10 rows. For the first weighting coefficient set, because the first weighting coefficient set is a set of all weighting coefficients in the codebook, the second weighting coefficient set includes bit quantization of at least one weighting coefficient selected from all the weighting coefficients. For example, if the first weighting coefficient set includes 100 weighting coefficients, the second weighting coefficient set may include two weighting coefficients, four weighting coefficients, six weighting coefficients, or more weighting coefficients in the 100 weighting coefficients. In addition, the second weighting coefficient set may alternatively be obtained by determining a submatrix by using the second space domain beam set and the second frequency domain beam set, then selecting at least one weighting coefficient from the submatrix, to obtain a subset of the first weighting coefficient set, and then performing bit quantization processing on the subset of the first weighting coefficient set. Specifically, bit quantization described in this embodiment of this application is to quantize each weighting coefficient in the subset of the first weighting coefficient set by using N bits. It should be understood that the foregoing example is merely used to understand this solution, and should not be construed as a limitation on this solution.

Specifically, Formula (2) may be used to describe a relationship between the first information and the first space domain beam set, the first frequency domain beam set, and the first weighting coefficient set:

$$\tilde{H}_i \approx SiCiFi^H; \quad (2)$$

herein, $\tilde{H}_i$ indicates first information corresponding to a network device i, Si indicates a first space domain beam set, Ci indicates a first weighting coefficient set, and $Fi^H$ indicates a first frequency domain beam set.

For example, an example in which three network devices serve the terminal device is used for description. According to the foregoing embodiment, the following equation may be obtained:

$$\begin{bmatrix} H_1 \\ H_2 \\ H_3 \end{bmatrix} \approx \begin{bmatrix} \alpha_1 S1C1F1^H \\ \alpha_2 S2C2F2^H \\ \alpha_3 S3C3F3^H \end{bmatrix}; \text{ or}$$

$$[H_1 H_2 H_3] \approx [\alpha_1 S1C1F1^H \ \alpha_2 S2C2F2^H \ \alpha_3 S3C3F3^H].$$

Herein, $H_1$ indicates the channel information 1 corresponding to the network device 1, $H_2$ indicates the channel information 2 corresponding to the network device 2, $H_3$ indicates the channel information 3 corresponding to the network device 3, $\alpha_1$ indicates second information obtained through quantization processing corresponding to $H_1$, $\alpha_2$ indicates second information obtained through quantization processing corresponding to $H_2$, $\alpha_3$ indicates second information obtained through quantization processing corresponding to $H_3$, S1 indicates a second space domain beam set corresponding to $H_1$, C1 indicates a second weighting coefficient set corresponding to $H_1$, $F1^H$ indicates a second frequency domain beam set corresponding to $H_1$, S2 indicates a second space domain beam set corresponding to $H_1$, C2 indicates a second weighting coefficient set corresponding to $H_2$, $F2^H$ indicates a second frequency domain beam set corresponding to $H_2$, S3 indicates a second space domain beam set corresponding to $H_3$, C3 indicates a second weighting coefficient set corresponding to $H_3$, and $F3^H$ indicates a second frequency domain beam set corresponding to $H_3$.

Further, the three second space domain beam sets, the three second frequency domain beam sets, and the three second weighting coefficient sets may further meet the following equation:

$$\begin{bmatrix} \alpha_1 S1C1F1^H \\ \alpha_2 S2C2F2^H \\ \alpha_3 S3C3F3^H \end{bmatrix} =$$

$$\begin{bmatrix} \alpha_1 & & \\ & \alpha_2 & \\ & & \alpha_3 \end{bmatrix} \begin{bmatrix} S1 & & \\ & S2 & \\ & & S3 \end{bmatrix} \begin{bmatrix} C1 & & \\ & C2 & \\ & & C3 \end{bmatrix} [F1 \ F2 \ F3]^H.$$

Alternatively, the following equation may be met:

$$[\alpha_1 S1C1F1^H \ \alpha_2 S2C2F2^H \ \alpha_3 S3C3F3^H] =$$

-continued $$[\alpha_1 \ \alpha_2 \ \alpha_3] \begin{bmatrix} S1 & & \\ & S2 & \\ & & S3 \end{bmatrix} \begin{bmatrix} C1 & & \\ & C2 & \\ & & C3 \end{bmatrix} \begin{bmatrix} F1^H & & \\ & F2^H & \\ & & F3^H \end{bmatrix}.$$

Herein, $\alpha_1$ indicates second information that is obtained through quantization processing and that is corresponding to the channel information 1, $\alpha_2$ indicates second information that is obtained through quantization processing and that is corresponding to the channel information 2, $\alpha_3$ indicates second information that is obtained through quantization processing and that is corresponding to the channel information 3, S1 indicates a second space domain beam set corresponding to the channel information 1, C1 indicates a second weighting coefficient set corresponding to the channel information 1, $F1^H$ indicates a second frequency domain beam set corresponding to the channel information 1, S2 indicates a second space domain beam set corresponding to the channel information 2, C2 indicates a second weighting coefficient set corresponding to the channel information 2, $F2^H$ indicates a second frequency domain beam set corresponding to the channel information 2, S3 indicates a second space domain beam set corresponding to the channel information 3, C3 indicates a second weighting coefficient set corresponding to the channel information 3, and $F3^H$ indicates a second frequency domain beam set corresponding to the channel information 3.

Because the at least one piece of first information obtained through quantization processing is jointly fed back to the terminal device, the second weighting coefficient set in the first information can resolve a problem of channel phase alignment between different network devices.

The foregoing mainly describes the information transmission method used in embodiments of this application by using the terminal device as an execution body. The following describes in detail the information transmission method used in embodiments of this application by using a network device as an execution body. FIG. 4 is a schematic diagram of another embodiment of an information transmission method according to an embodiment of this application. The information transmission method includes the following operations.

S201: The network device receives channel state information CSI, where the CSI includes R pieces of first information obtained through quantization processing, or R pieces of first information obtained through quantization processing and R pieces of second information obtained through quantization processing, the first information is small-scale information obtained through normalization processing, the second information is large-scale information obtained through normalization processing, the small-scale information and the large-scale information belong to channel information, and R is an integer greater than or equal to 1.

In this embodiment, each network device that provides a service for the terminal device may receive CSI sent by the terminal device, and the CSI includes R pieces of first information obtained through quantization processing, or the CSI includes R pieces of first information obtained through quantization processing and R pieces of second information obtained through quantization processing. Specifically, a manner of obtaining the first information obtained through quantization processing and the second information obtained through quantization processing, and a manner of obtaining first information and second information are similar to those in the foregoing embodiment, and details are not described herein again.

S202: The network device obtains target channel information based on the CSI, where the target channel information includes small-scale information corresponding to the network device and large-scale information corresponding to the network device.

In this embodiment, if the CSI includes the R pieces of first information obtained through quantization processing and the R pieces of second information obtained through quantization processing, the network device performs quantization processing and normalization processing based on the CSI, to obtain the small-scale information corresponding to the network device and the large-scale information corresponding to the network device. Second, if the CSI includes only the R pieces of first information obtained through quantization processing, the network device further may measure an uplink sounding reference signal (SRS) to obtain uplink large-scale information, and then obtain the target channel information of the network device based on the R pieces of first information obtained through quantization processing and the uplink large-scale information. The target channel information may include the small-scale information corresponding to the network device and the large-scale information corresponding to the network device. The small-scale information corresponding to the network device is included, and the large-scale information corresponding to the network device is obtained by using another reference signal, for example, an SRS. Specifically, after obtaining a second weighting coefficient set, the network device may determine a location of a non-zero weighting coefficient by using a bitmap, and then obtain a result of quantizing a submatrix determined by using a second space domain beam set and a second frequency domain beam set.

Specifically, the network device determines the channel information based on the CSI fed back by the terminal device, so as to determine precoding and a quantity of transport streams for transmitting data to the terminal device. The network device may determine, based on a channel quality indication (CQI) fed back by the terminal device, a modulation order for transmitting data to the terminal device and a bit rate of channel coding, so that the network device can send data to the terminal device based on the quantity of streams, the modulation order, the bit rate, and precoding.

It can be learned from the foregoing embodiment that the CSI sent by the terminal device may include the R pieces of first information obtained through quantization processing and the R pieces of second information obtained through quantization processing, or include the R pieces of first information obtained through quantization processing. The following uses an example in which two network devices serve the terminal device to separately describe cases in which the CSI includes different information.

1. The CSI includes the R pieces of first information obtained through quantization processing.

Figure 5:
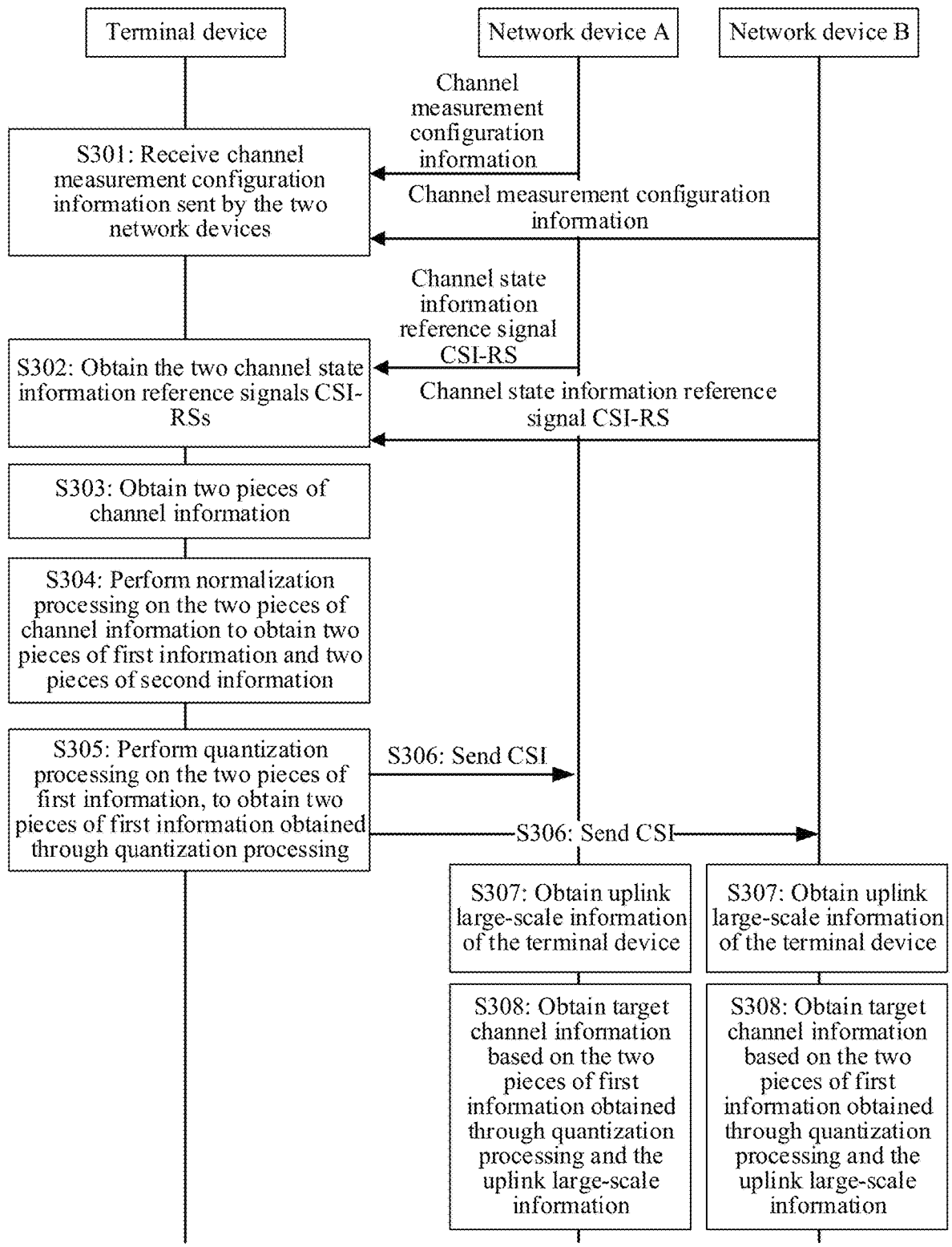
FIG. 5 is a schematic diagram of another embodiment of an information transmission method according to an embodiment of this application.

FIG. 5 is a schematic diagram of another embodiment of an information transmission method according to an embodiment of this application. The information transmission method includes the following operations.

S301: A terminal device receives channel measurement configuration information sent by two network devices.

In this embodiment, the terminal device receives channel measurement configuration information sent by two network devices, that is, receives channel measurement configuration information 1 sent by a network device A and channel measurement configuration information 2 sent by a network device B. To reduce overheads of CSI reported by the terminal device, CSI reporting overheads may be controlled. To be specific, a quantity of space domain beams, a quantity of frequency domain beams, and a quantity of weighting coefficients may be determined in the channel configuration information. The following separately provides descriptions.

1. Quantity of Space Domain Beams

The channel configuration information sent by the network device may be used to determine a maximum value of a total quantity of space domain beams in two second space domain beam sets. Specifically, the channel measurement configuration information includes a first space domain beam value, the first space domain beam value is used for obtaining the maximum value of the total quantity of space domain beams in the two second space domain beam sets, and the first space domain beam value may be an integer or a proportional coefficient. It should be understood that, in actual application, the integer may be used to directly determine the maximum value of the total quantity of space domain beams in the two second space domain beam sets. For example, the first space domain beam value is 12. In this case, it indicates that the maximum value of the total quantity of space domain beams included in the two second space domain beam sets is 12. In addition, the integer may further be used to determine an average value of quantities of space domain beams in the two second space domain beam sets. For example, if the first space domain beam value is 12, the maximum value of the total quantity of space domain beams in the two second space domain beam sets is 24. When the first space domain beam value is an integer, whether the maximum value of the total quantity of space domain beams in the two second space domain beam sets is directly determined or an average value of a quantity of space domain beams in each second space domain beam set is determined may be predefined, or may be determined by using signaling, and the signaling is RRC signaling or MAC CE signaling.

In addition, when the first space domain beam value is the proportional coefficient, the proportional coefficient may also be used to directly determine the maximum value of the total quantity of space domain beams in the two second space domain beam sets. For example, if the second space domain beam value is $2/5$, it indicates that the maximum value of the total quantity of space domain beams included in the two second space domain beam sets is $2/5$, that is, 40% of a total quantity of space domain beams included in first space domain beam sets. In addition, an average value of quantities of space domain beams in the two second space domain beam sets may be further determined by using the proportional coefficient. For example, if the first space domain beam value is $1/10$, the maximum value of the total quantity of space domain beams in the two second space domain beam sets is 2/10. In this case, 2 is a positive integer greater than or equal to 10. When the first space domain beam value is a proportional coefficient, whether the maximum value of the total quantity of space domain beams in the two second space domain beam sets is directly determined or an average value of a quantity of space domain beams in each second space domain beam set is determined may be predefined, or may be determined by using signaling, and the signaling is RRC signaling or MAC CE signaling.

In some embodiments, the channel configuration information may be further used to determine a maximum value of a quantity of space domain beams in each second space domain beam set, and one second space domain beam set corresponds to a maximum value of a quantity of space domain beams in the second space domain beam set. Specifically, the channel measurement configuration information includes second space domain beam values, and the second space domain beam values may be integers or proportional coefficients. For example, if the second space domain beam sets are a second space domain beam set A and a second space domain beam set B, the first space domain beam sets include a first space domain beam set A and a first space domain beam set B. If the second space domain beam values are integers, when the second space domain beam values are 8 and 4, 8 corresponds to the second space domain beam set A, and 4 corresponds to the second space domain beam set B, it may indicate that a maximum value of a quantity of space domain beams included in the second space domain beam set A is 8, and a maximum value of a quantity of space domain beams included in the second space domain beam set B is 4. When the second space domain beam values are proportional coefficients, for example, the second space domain beam values are $2/5$ and $3/5$, $2/5$ corresponds to the second space domain beam set A, and $3/5$ corresponds to the second space domain beam set B, it may indicate that a maximum value of a quantity of space domain beams included in the second space domain beam set A is $2/5$, that is, 40% of the first space domain beam set A, and a maximum value of a quantity of space domain beams included in the second space domain beam set B is $3/5$, that is, 60% of a quantity of space domain beams in the first space domain beam set B.

Specifically, the channel configuration information may be used to determine a maximum value of a quantity of space domain beams in a second space domain beam set. In this case, a maximum value of a quantity of space domain beams in a second space domain beam set in one polarization direction is restricted. However, in actual application, in a dual-polarization case, a maximum value of a quantity of space domain beams in a second space domain beam set in two polarization directions may be restricted. Therefore, the determined maximum value in one polarization direction further may be multiplied by 2, so as to restrict the quantity of space domain beams in the dual-polarization case. For example, if the maximum value of the quantity of space domain beams in the second space domain beam set obtained in the foregoing manner is 12, the maximum value of the quantity of space domain beams in the second space domain beam set in the dual-polarization case should be 24. It should be understood that the foregoing example is merely used to understand this solution, and should not be construed as a limitation on this solution.

2. Quantity of Frequency Domain Beams

The channel configuration information sent by the network device may be used to determine a maximum value of a total quantity of frequency domain beams in two second frequency domain beam sets. Specifically, the channel measurement configuration information includes a first frequency domain beam value, and the first frequency domain beam value may be an integer or a proportional coefficient. It should be understood that in actual application, the integer may be used to directly determine a maximum value of a total quantity of frequency domain beams in R second frequency domain beam sets. For example, if the first frequency domain beam value is 20, it indicates that a maximum value of a total quantity of frequency domain beams included in two second frequency domain beam sets is 20. In addition, the integer may further be used to determine an average value of a quantity of frequency domain beams in each second frequency domain beam set.

For example, if the first frequency domain beam value is 20, the maximum value of the total quantity of frequency domain beams in the R second frequency domain beam sets is 20*R. When the first frequency domain beam value is an integer, whether the maximum value of the total quantity of frequency domain beams in the R second frequency domain beam sets is directly determined or the average value of the quantity of frequency domain beams in each second frequency domain beam set is determined may be predefined, or may be determined by using signaling, and the signaling is RRC signaling or MAC CE signaling. In addition, when the first frequency domain beam value is the proportional coefficient, the proportional coefficient may also be used to directly determine the maximum value of the total quantity of frequency domain beams in the R second frequency domain beam sets. For example, if the second frequency domain beam value is ¼, it indicates that the maximum value of the total quantity of frequency domain beams included in the R second frequency domain beam sets is ¼, that is, 25% of a total quantity of frequency domain beams included in first frequency domain beam sets. In addition, an average value of quantities of frequency domain beams in the R second frequency domain beam sets may be further determined by using the proportional coefficient. For example, if the first frequency domain beam value is 1/20, the maximum value of the total quantity of frequency domain beams in the R second frequency domain beam sets is R/20. In this case, R is a positive integer greater than or equal to 20. When the first frequency domain beam value is a proportional coefficient, whether the maximum value of the total quantity of frequency domain beams in the R second frequency domain beam sets is directly determined or the average value of the quantity of frequency domain beams in each second frequency domain beam set is determined may be predefined, or may be determined by using signaling, and the signaling is RRC signaling or MAC CE signaling.

In addition, the channel configuration information may be further used to determine a maximum value of a quantity of frequency domain beams in each second frequency domain beam set, and one second frequency domain beam set corresponds to a maximum value of a quantity of frequency domain beams in the second frequency domain beam set. Specifically, the channel measurement configuration information includes second frequency domain beam values, and the second frequency domain beam values may be integers or proportional coefficients. For example, if the second frequency domain beam sets are a second frequency domain beam set A and a second frequency domain beam set B, the first frequency domain beam sets include a first frequency domain beam set A and a first frequency domain beam set B. If the second frequency domain beam values are integers, when the second frequency domain beam values are 15 and 5, 15 corresponds to the second frequency domain beam set A, and 5 corresponds to the second frequency domain beam set B, it may indicate that a maximum value of a quantity of frequency domain beams included in the second frequency domain beam set A is 15, and a maximum value of a quantity of frequency domain beams included in the second frequency domain beam set B is 5. When the second frequency domain beam values are proportional coefficients, for example, the second frequency domain beam values are ¾ and ¼, ¾ corresponds to the second frequency domain beam set A, and ¼ corresponds to the second frequency domain beam set B, it may indicate that a maximum value of a quantity of frequency domain beams included in the second frequency domain beam set A is ¾, that is, 75% of a quantity of frequency domain beams in the first frequency domain beam set A, and a maximum value of a quantity of frequency domain beams included in the second frequency domain beam set B is ¼, that is, 25% of a quantity of frequency domain beams in the first frequency domain beam set B.

It should be understood that, in actual application, the channel measurement configuration information may further include a bitmap, and a quantity of space domain beams and a quantity of frequency domain beams are restricted by using a bitmap size. Specifically, the channel configuration information includes a first bitmap. A maximum value of a total quantity of space domain beams in two second space domain beam sets and a maximum value of a total quantity of frequency domain beams in two second frequency domain beam sets may be obtained through calculation by using the first bitmap. For example, if the first bitmap is 64, a maximum value of a product of the maximum value of the total quantity of space domain beams in the two second space domain beam sets and the maximum value of the total quantity of frequency domain beams in the two second frequency domain beam sets is 64. Alternatively, the first bitmap may further be used to determine a maximum value of a sum of products of a quantity of space domain beams in each second space domain beam set and a quantity of frequency domain beams in the second frequency domain beam set.

Specifically, Formula (3) may describe a relationship between the first bitmap and the quantity of space domain beams in the second space domain beam set and the quantity of frequency domain beams in the second frequency domain beam set:

$$\Sigma_i M_i L_i \leq X; \qquad (3)$$

herein, $M_i$ indicates the quantity of frequency domain beams in the second frequency domain beam set, $L_i$ indicates the quantity of space domain beams in the second space domain beam set, and X indicates the first bitmap.

In addition, the channel configuration information may further include a second bitmap. The second bitmap may be used to restrict a maximum quantity of space domain beams in each second space domain beam set and a maximum quantity of frequency domain beams in each second frequency domain beam set. A specific correspondence is similar to that in the foregoing embodiment, and details are not described herein again. For example, the second space domain beam sets are a second space domain beam set A and a second space domain beam set B, and the second frequency domain beam sets are a second frequency domain beam set A and a second frequency domain beam set B. When the second bitmaps are 16 and 4, 16 corresponds to the second space domain beam set A and the second frequency domain beam set A, and 4 corresponds to the second space domain beam set B and the second frequency domain beam set B, in this case, a product of a quantity of space domain beams in the second space domain beam set A and a quantity of frequency domain beams in the second frequency domain beam set A is less than or equal to 16. When the quantity of space domain beams in the second space domain beam set A is 4, a value range of the quantity of frequency domain beams in the second frequency domain beam set A is [1, 4]. In addition, a product of a quantity of space domain beams in the second space domain beam set B and a quantity of frequency domain beams in the second frequency domain beam set B is less than or equal to 4. When the quantity of space domain beams in the second space domain beam set B is 2, a value range of the quantity of frequency domain beams in the second frequency domain beam set B is [1, 2].

In some embodiments, the quantity of space domain beams in the second space domain beam set and the quantity of frequency domain beams in the second frequency domain beam set may be further restricted by using a table. This table is predefined. For example, Table 1 is used to indicate a combination of a space domain beam quantity and a frequency domain beam quantity that are corresponding to each base station.

TABLE 1

| Parameter index | Space domain beam quantity | Frequency domain beam quantity |
| --- | --- | --- |
| Index 1 | L1 | M1 |
| Index 2 | L2 | M2 |

Index 1 indicates a first combination of a space domain beam quantity and a frequency domain beam quantity corresponding to a base station. In a single-polarization case, a quantity of space domain beams in a second space domain beam set corresponding to Index 1 is L1, and a quantity of frequency domain beams in a second frequency domain beam set corresponding to Index 1 is M1. In a dual-polarization case, a quantity of space domain beams in a second space domain beam set corresponding to Index 1 is 2L1, and a quantity of frequency domain beams in a second frequency domain beam set is M1. Index 2 indicates a second combination of a space domain beam quantity and a frequency domain beam quantity corresponding to the base station. Similarly, in a single-polarization case, a quantity of space domain beams in a second space domain beam set corresponding to Index 2 is L2, and a quantity of frequency domain beams in a second frequency domain beam set is M2. In a dual-polarization case, a quantity of space domain beams in a second space domain beam set corresponding to Index 2 is 2L2, and a quantity of frequency domain beams in a second frequency domain beam set is M2.

Therefore, the channel measurement configuration information may include a parameter index, and a restricted quantity of beams may be determined by using the parameter index. For example, when the parameter index included in the channel measurement configuration information is Index 1, in a dual-polarization case, it may be determined that a restricted quantity of space domain beams in the second space domain beam set is 2L1, and a quantity of frequency domain beams in the second frequency domain beam set is M1.

In some embodiments, a quantity of bitmaps may be further restricted in the table, so as to restrict a quantity of space domain beams in the second space domain beam set and a quantity of frequency domain beams in the second frequency domain beam set. For example, a quantity of bitmaps of the base station is indicated by using Table 2. A manner of indicating the quantity of bitmaps is described in the foregoing embodiment, and details are not described herein again.

TABLE 2

| Parameter index | Quantity of bitmaps |
| --- | --- |
| Index 1 | X1 |
| Index 2 | X2 |

Index 1 indicates a quantity of first-type bitmaps corresponding to the base station, and a first bitmap and/or a second bitmap corresponding to Index 1 are/is X1. Index 2 indicates a quantity of second-type bitmaps corresponding to the base station, and a first bitmap and/or a second bitmap corresponding to Index 2 are/is X2.

Therefore, the channel measurement configuration information may include a parameter index, and a restricted quantity of beams may be determined by using the parameter index. For example, if the parameter index included in the channel measurement configuration information is Index 2, it may be determined that the restricted quantity of bitmaps is X2. A restricted quantity of space domain beams in the second space domain beam set and a restricted quantity of frequency domain beams in the second frequency domain beam set may be determined in a manner similar to that in the foregoing embodiment. Details are not described herein again.

It should be understood that in actual application, there may be another restriction manner, and a specific restriction manner should not be understood as a limitation of this application.

3. Quantity of Coefficients

The channel configuration information sent by the network device may be used to determine a maximum value of a total quantity of weighting coefficients in two second weighting coefficient sets. Specifically, the channel measurement configuration information includes a first weighting coefficient value, and the first weighting coefficient value may be an integer or a proportional coefficient. It should be understood that in actual application, the integer may be used to directly determine a maximum value of a total quantity of space domain beams in R second weighting coefficient sets. For example, if the first weighting coefficient value is 100, it indicates that the maximum value of the total quantity of weighting coefficients included in the two second weighting coefficient sets is 100. In addition, the integer may further be used to determine an average value of a quantity of weighting coefficients in each second weighting coefficient set. For example, if the first weighting coefficient value is 10, the maximum value of the total quantity of weighting coefficients in the R second weighting coefficient sets is 10*R. When the first weighting coefficient value is an integer, whether the maximum value of the total quantity of weighting coefficients in the R second weighting coefficient sets is directly determined or the average value of the quantity of weighting coefficients in each second weighting coefficient set is determined may be predefined, or may be determined by using signaling, and the signaling is RRC signaling or MAC CE signaling. In addition, when the first weighting coefficient value is a proportional coefficient, because the second weighting coefficient set is a set obtained by determining a submatrix from the first weighting coefficient set, and then selecting some weighting coefficients from the submatrix for bit quantization, the proportional coefficient is used to determine a quantity of weighting coefficients for performing bit quantization in the submatrix. The proportional coefficient may be used to directly determine a maximum value of the quantity of weighting coefficients for performing bit quantization in the submatrix. For example, if the first weighting coefficient value is ½, it indicates that a maximum value of a total quantity of weighting coefficients that are included in the R second weighting coefficient sets and that are used for bit quantization is ½, that is, 50% of a total quantity of weighting coefficients included in the submatrix. In addition, the proportional coefficient may further be used to determine an average value of a quantity of weighting coefficients for bit quantization in the submatrix. For example, the channel information includes three first weighting coefficient sets, the three first weighting coefficient sets are respectively a first weighting coefficient set 1, a first weighting coefficient set 2, and a first weighting coefficient set 3, and the first weighting coefficient value is 1/5. This indicates a maximum value of a total quantity of weighting coefficients for bit quantization that are included in the three second weighting coefficient sets is 3/5, that is, 60% of a total quantity of weighting coefficients included in three submatrixes. When the first weighting coefficient value is a proportional coefficient, whether the maximum value of the total quantity of weighting coefficients in the R second weighting coefficient sets is directly determined or the average value of the quantity of weighting coefficients in each second weighting coefficient set is determined may be predefined, or may be determined by using signaling, and the signaling is RRC signaling or MAC CE signaling.

In addition, the channel configuration information may be further used to determine a maximum value of a quantity of weighting coefficients in each second weighting coefficient set, and one second weighting coefficient set corresponds to a maximum value of a quantity of weighting coefficients in the second weighting coefficient set. Specifically, the channel measurement configuration information includes a second weighting coefficient value, and the second weighting coefficient value may be an integer or a proportional weighting coefficient. For example, if the second weighting coefficient sets are a second weighting coefficient set A and a second weighting coefficient set B, the first weighting coefficient sets include a first weighting coefficient set A and a first weighting coefficient set B. If the second weighting coefficient values are integers, when the second weighting coefficient values are 50 and 30, 50 corresponds to the second weighting coefficient set A, and 30 corresponds to the second weighting coefficient set B, it may indicate that a maximum value of a quantity of weighting coefficients included in the second weighting coefficient set A is 50, and a maximum value of a quantity of weighting coefficients included in the second weighting coefficient set B is 30. If the second weighting coefficient values are proportional coefficients, when the second weighting coefficient values are 1/5 and 2/5, 1/5 corresponds to the second weighting coefficient set A, and 2/5 corresponds to the second weighting coefficient set B, a maximum value of a quantity of weighting coefficients for bit quantization that are included in the second weighting coefficient set A is 1/5 of a total quantity of weighting coefficients included in a submatrix corresponding to the first weighting coefficient set A, and a maximum value of a quantity of weighting coefficients for bit quantization that are included in the second weighting coefficient set B is 2/5 of a total quantity of weighting coefficients included in a submatrix corresponding to the first weighting coefficient set B.

It may be understood that the foregoing example is merely used to understand this solution, and a quantity of space domain beams, a quantity of frequency domain beams, and a quantity of weighting coefficients may be flexibly determined based on an actual situation.

S302: The terminal device obtains two channel state information reference signals CSI-RSs corresponding to two network devices.

In this embodiment, two network devices send CSI-RSs to the terminal device, so that the terminal device can obtain two channel state information reference signals CSI-RSs corresponding to the two network devices.

S303: The terminal device obtains two pieces of channel information.

In this embodiment, the terminal device measures the two CSI-RSs corresponding to the two network devices, to obtain two pieces of channel information. Channel information and a manner of obtaining the channel information are similar to those in operation 101, and details are not described herein again.

S304: The terminal device performs normalization processing on the two pieces of channel information to obtain two pieces of first information and two pieces of second information.

In this embodiment, the terminal device performs normalization processing on the two pieces of channel information to obtain the two pieces of first information and the two pieces of second information. Specifically, the first information, the second information, and an obtaining manner are similar to those in operation 102, and details are not described herein again.

S305: The terminal device performs quantization processing on the two pieces of first information, to obtain two pieces of first information obtained through quantization processing.

In this embodiment, it can be learned from the foregoing embodiment that the first information includes the first space domain beam set, the first frequency domain beam set, and the first weighting coefficient set. Therefore, the terminal device may perform quantization processing on the two pieces of first information, that is, the terminal device performs quantization processing on subsets of the first space domain beam set, the first frequency domain beam set, and the first weighting coefficient set, to obtain the second space domain beam set, the second frequency domain beam set, and the second weighting coefficient set.

The performing quantization processing on the first information is performing quantization processing on a subset of the first weighting coefficient set in the first information. In the following, because the channel measurement configuration information sent by the network device in operation S301 is used to determine a quantity of space domain beams, a quantity of frequency domain beams, and a quantity of weighting coefficients, a quantity of space domain beams in the second space domain beam set, a quantity of frequency domain beams in the second frequency domain beam set, and a quantity of weighting coefficients in a subset of the second weighting coefficient set may be jointly determined based on maximum values determined based on the channel measurement configuration information. Description is separately provided below.

1. Quantity of Space Domain Beams

If the channel measurement configuration information is used for determining the maximum value of the total quantity of space domain beams in the two second space domain beam sets, the total quantity of space domain beams in the two second space domain beam sets is less than or equal to the maximum value of the total quantity of space domain beams in the two second space domain beam sets. For example, if the maximum value of the total quantity of space domain beams in the two second space domain beam sets determined based on the channel measurement configuration information is 12, a value range of the total quantity of space domain beams in the two second space domain beam sets is [1, 12]. If the channel measurement configuration information is used for determining the maximum value of the quantity of space domain beams in each second space domain beam set, and one second space domain beam set corresponds to a maximum value of a quantity of space domain beams in the second space domain beam set, the quantity of space domain beams in the second space domain beam set is less than or equal to the maximum value of the quantity of space domain beams in the corresponding second space domain beam set. For example, the second space domain beam sets are a second space domain beam set A and a second space domain beam set B. When the second space domain beam values are 8 and 4, 8 corresponds to the second space domain beam set A, and 4 corresponds to the second space domain beam set B, a value range of a quantity of space domain beams in the second space domain beam set A is [1, 8], and a value range of a quantity of space domain beams in the second space domain beam set B is [1, 4].

Joint selection is performed on the two first space domain beam sets, so as to resolve a problem of different space domain sparseness of channels between network devices. Specifically, the first space domain beam set may alternatively be a codebook, and a codebook form is a DFT matrix form, for example, DFT(TX), Kron(DFT(RX), DFT(TX)), or DFT(RX). DFT(TX) is a discrete Fourier transform (DFT) matrix of a TX dimension size, and Kron(DFT(RX), DFT(TX)) is a Kronecker product of DFT(RX) and DFT (TX), where DFT(RX) is a DFT matrix of an RX dimension size. TX is a transmit antenna value or a transmit port value, and RX is a receive antenna value or a receive port value. DFT (TX) mainly considers a weight of a transmit end, DFT (RX) mainly reflects a weight of a receive end, and Kron (DFT(RX), DFT(TX)) considers a joint weight of the transmit and receive ends.

2. Quantity of Frequency Domain Beams

If the channel measurement configuration information is used for determining the maximum value of the total quantity of frequency domain beams in the two second frequency domain beam sets, the total quantity of frequency domain beams in the two second frequency domain beam sets is less than or equal to the maximum value of the total quantity of frequency domain beams in the two second frequency domain beam sets. For example, if the maximum value of the total quantity of frequency domain beams in the two second frequency domain beam sets determined based on the channel measurement configuration information is 20, a value range of the total quantity of frequency domain beams in the two second frequency domain beam sets is [1, 20]. If the channel measurement configuration information is used for determining the maximum value of the quantity of frequency domain beams in each second frequency domain beam set, and one second frequency domain beam set corresponds to a maximum value of the quantity of frequency domain beams in the second frequency domain beam set, the quantity of frequency domain beams in the second frequency domain beam set is less than or equal to the maximum value of the quantity of frequency domain beams in the corresponding second frequency domain beam set. For example, the second frequency domain beam sets are a second frequency domain beam set A and a second frequency domain beam set B. When the second frequency domain beam values are 15 and 5, 15 corresponds to the second frequency domain beam set A, and 5 corresponds to the second frequency domain beam set B, a value range of a quantity of frequency domain beams in the second frequency domain beam set A is [1, 15], and a value range of a quantity of frequency domain beams in the second frequency domain beam set B is [1, 5].

The two first frequency domain beam sets are jointly selected, so as to resolve a problem of different frequency domain sparseness of channels between network devices. Specifically, a codebook form of the first frequency domain beam set is DFT(S), and DFT(S) determines a DFT matrix of an S-dimensional size. S is a frequency domain unit value.

3. Quantity of Weighting Coefficients

If the channel measurement configuration information is used for determining the maximum value of the total quantity of weighting coefficients in the two second weighting coefficient sets, the total quantity of weighting coefficients in the two second weighting coefficient sets is less than or equal to the maximum value of the total quantity of weighting coefficients in the two second weighting coefficient sets. For example, if the maximum value of the total quantity of weighting coefficients in the two second weighting coefficient sets determined based on the channel measurement configuration information is 100, a value range of the total quantity of weighting coefficients in the two second weighting coefficient sets is [1, 100]. If the channel measurement configuration information is used for determining a maximum value of a quantity of weighting coefficients in each second weighting coefficient set, and one second weighting coefficient set corresponds to a maximum value of a quantity of weighting coefficients in the second weighting coefficient set, the quantity of weighting coefficients in the second weighting coefficient set is less than or equal to the maximum value of the quantity of weighting coefficients in the corresponding second weighting coefficient set. For example, the second weighting coefficient sets are respectively a second weighting coefficient set A and a second weighting coefficient set B. When the second weighting coefficient values are 50 and 50, 50 corresponds to the second weighting coefficient set A, and 50 corresponds to the second weighting coefficient set B, a value range of a quantity of weighting coefficients in the second weighting coefficient set A is [1, 50], and a value range of a quantity of weighting coefficients in the second weighting coefficient set B is [1, 50].

The quantities of weighting coefficients in the subsets of the two first weighting coefficient sets are jointly determined, so as to resolve a problem that different network devices require different quantities of weighting coefficients due to different large-scale information or different channel sparseness.

It may be understood that the foregoing example is merely used to understand this solution. Specifically, the quantity of space domain beams in the second space domain beam set, the quantity of frequency domain beams in the second frequency domain beam set, and the quantity of weighting coefficients in the second weighting coefficient set should not be construed as a limitation on this solution.

Specifically, quantization processing may be performed on the first weighting coefficient set in two manners. One manner is that a weighting coefficient is determined in subsets of the two first weighting coefficient sets as a first reference weighting coefficient, and the first reference weighting coefficient is a weighting coefficient with a largest amplitude in the subsets of the two first weighting coefficient sets. That is, the first reference weighting coefficient is set to 1 as a quantization reference, and then quantization processing is performed on relative amplitudes and relative phases between all weighting coefficients in the two first weighting coefficient sets and the first reference weighting coefficient, to obtain the two second weighting coefficient sets. The second weighting coefficient set may include the first reference weighting coefficient, or may not include the first reference weighting coefficient. When the second weighting coefficient set does not include the second reference weighting coefficient, the network device may be notified of a location of the first reference weighting coefficient. In the other manner, two second reference weighting coefficients are determined in subsets of the two first weighting coefficient sets, where a subset of one first weighting coefficient set corresponds to one second reference weighting coefficient, and the second reference weighting coefficient is a weighting coefficient with a largest amplitude in the subset of the corresponding first weighting coefficient set. That is, the second reference weighting coefficient is set to 1 as a quantization reference, then a second reference weighting coefficient is determined in the two second reference weighting coefficients as a third reference weighting coefficient, then quantization processing is performed on relative amplitudes and relative phases between the two weighting coefficient sets and the corresponding second reference weighting coefficients, and quantization processing is performed on relative amplitudes and relative phases between the two second reference weighting coefficients and the third reference weighting coefficient, to obtain the two second weighting coefficient sets. The second weighting coefficient set may include the second reference weighting coefficient, or may not include the second reference weighting coefficient. When the second weighting coefficient set does not include the second reference weighting coefficient, the network device may be notified of a location of the second reference weighting coefficient.

In some embodiments, the third reference weighting coefficient may be a second reference weighting coefficient with a largest value in the two second reference weighting coefficients, or a second reference weighting coefficient with a smallest value in the two second reference weighting coefficients; or a second reference weighting coefficient corresponding to a network device initially accessed by the terminal device is the third reference weighting coefficient; or a second reference weighting coefficient corresponding to a cell initially accessed by the terminal device is the third reference weighting coefficient; or a second reference weighting coefficient corresponding to any network device is the third reference weighting coefficient; a second reference weighting coefficient corresponding to a network device with a smallest identifier is the third reference weighting coefficient; or a second reference weighting coefficient corresponding to a network device with a largest identifier is the third reference weighting coefficient. A specific manner of determining the third reference weighting coefficient is not limited herein.

S306: The terminal device sends CSI to the two network devices, where the CSI includes the two pieces of first information obtained through quantization processing.

In this embodiment, a manner in which the terminal device sends the CSI to the two network devices is similar to that in operation S103. Details are not described herein again. The first information obtained through quantization processing includes the second space domain beam set and the second frequency domain beam set. The second space domain beam set and the second frequency domain beam set may be directly fed back, or may be fed back by using a parameter index, for example, a PMI. Therefore, when one piece of CSI includes a plurality of channel measurement resources, each piece of channel information may be arranged in order.

For example, if a CSI measurement configuration includes three channel measurement resources, quantized first information 1 is obtained based on the first channel measurement resource, quantized first information 2 is obtained based on the second channel measurement resource, and quantized first information 3 is obtained based on the third channel measurement resource, sorting may be performed in an order of "quantized first information 1, quantized first information 2, and quantized first information 3". Each piece of quantized first information may include a quantity of second space domain beams, a second space domain beam set, a quantity of second frequency domain beams, a second frequency domain beam set, a bitmap, and a second weighting coefficient set.

In a possibility, the quantity of second space domain beams, the second space domain beam set, the quantity of second frequency domain beams, the second frequency domain beam set, the bitmap, and the second weighting coefficient set that are included in the quantized first information 1 are first reported, and then the quantity of second space domain beams, the second space domain beam set, the quantity of second frequency domain beams, the second frequency domain beam set, the bitmap, and the second weighting coefficient set that are included in the quantized first information 2 are reported, and so on.

In addition, in another possibility, for the quantity of second space domain beams, sorting may be performed in an order of "the quantity of second space domain beams of the quantized first information 1, the quantity of second space domain beams of the quantized first information 2, and the quantity of second space domain beams of the quantized first information 3". For the second space domain beam set, sorting may be performed in an order of "the second space domain beam set of the first information 1, the second space domain beam set of the first information 2, and the second space domain beam set of the first information 3". Similarly, for the quantity of second frequency domain beams, sorting may be performed in an order of "the quantity of second frequency domain beams of the quantized first information 1, the quantity of second frequency domain beams of the quantized first information 2, and the quantity of second frequency domain beams of the quantized first information 3". A sorting manner of the second frequency domain beam set, the bitmap, and the second weighting coefficient set is similar to that in the foregoing example, and details are not described herein again. Specifically, in this embodiment of this application, the quantity of second space domain beams and the quantity of second frequency domain beams are indexes of a table.

In some embodiments, if the selected second frequency domain beam set is 0 or the selected second space domain beam set is 0, the second weighting coefficient set is not reported, and the quantity of second frequency domain beams or the quantity of second space domain beams may be reported as 0, or is 0 by default.

In some embodiments, if the selected second weighting coefficient set is 0, the second weighting coefficient set is not reported, and the quantity of second frequency domain beams or the quantity of second space domain beams may be reported as 0, or is 0 by default.

In some embodiments, the terminal device may add N pieces of bit information to notify the network device whether there is quantization feedback on all the three channel measurement resources. For example, the terminal device obtains quantized first information 1, quantized first information 2, and quantized first information 3 based on the measured channel information. The terminal device chooses to report only the quantized first information 1 and the quantized first information 2, and does not report the quantized first information 3. In this case, 3 bits may be used to notify the network device whether the three pieces of quantized first information exist.

It should be understood that the foregoing example is merely used to understand this solution, and should not be construed as a limitation on this solution.

S307: The network device obtains uplink large-scale information of the terminal device.

In this embodiment, the network device performs measurement on an uplink sounding reference signal (SRS), to obtain uplink large-scale information.

S308: The network device obtains target channel information based on the two pieces of first information obtained through quantization processing and the uplink large-scale information.

A manner in which the network device obtains the target channel information based on the two pieces of first information obtained through quantization processing and the uplink large-scale information is similar to operation S202, and details are not described herein again.

2. The CSI Includes the R Pieces of First Information Obtained Through Quantization Processing and the R Pieces of Second Information Obtained Through Quantization Processing.

Figure 6:
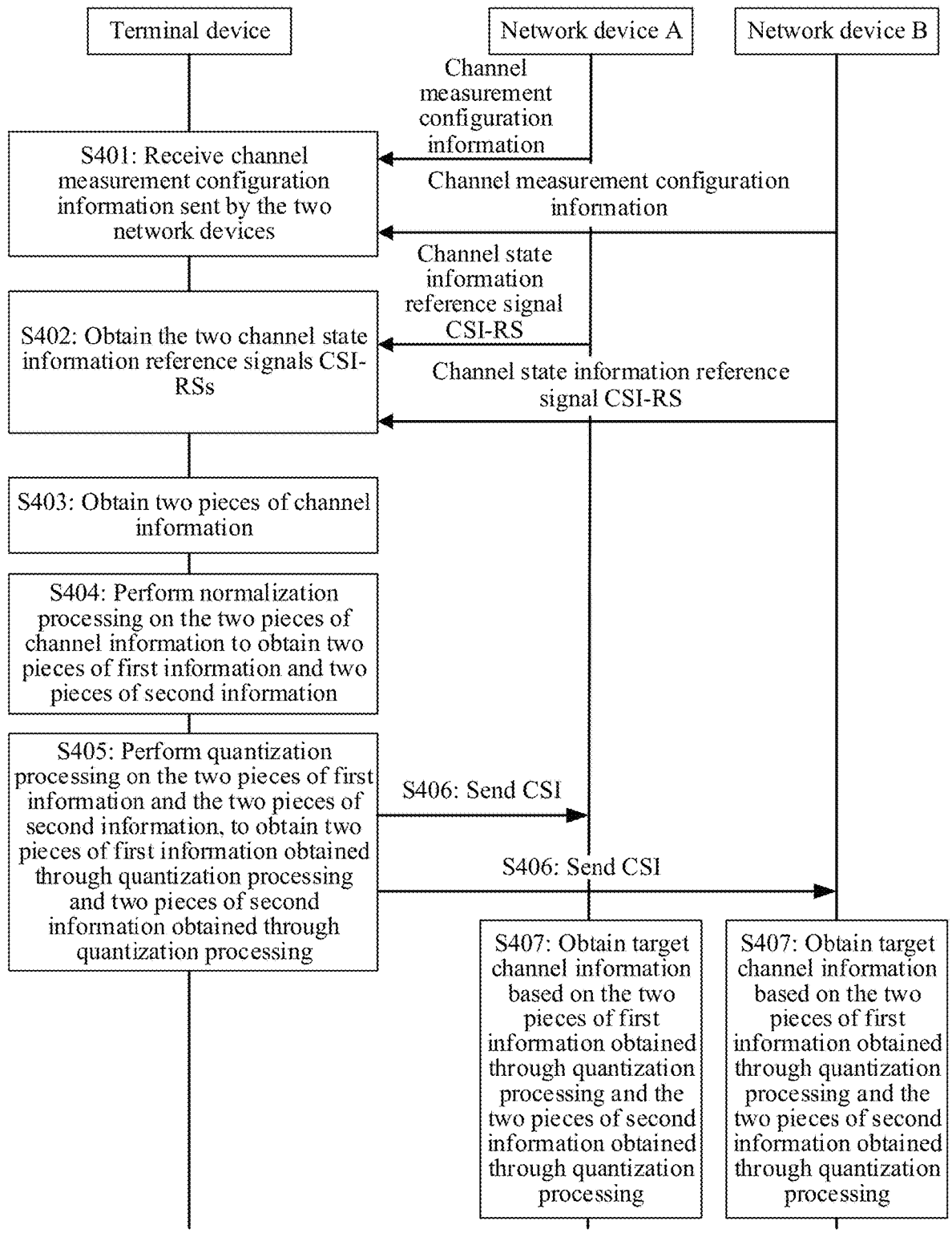
FIG. 6 is a schematic diagram of another embodiment of an information transmission method according to an embodiment of this application.

FIG. 6 is a schematic diagram of another embodiment of an information transmission method according to an embodiment of this application. The information transmission method includes the following operations.

S401: A terminal device receives channel measurement configuration information sent by two network devices.

In this embodiment, a manner in which the terminal device receives the channel measurement configuration information sent by the two network devices is similar to operation S301, and details are not described herein again.

S402: The terminal device obtains two channel state information reference signals CSI-RSs corresponding to the two network devices.

In this embodiment, a manner in which the terminal device obtains the two channel state information reference signals CSI-RSs corresponding to the two network devices is similar to operation S302, and details are not described herein again.

S403: The terminal device obtains two pieces of channel information.

In this embodiment, a manner in which the terminal device obtains the two pieces of channel information is similar to operation S303, and details are not described herein again.

S404: The terminal device performs normalization processing on the two pieces of channel information to obtain two pieces of first information and two pieces of second information.

In this embodiment, a manner in which the terminal device performs normalization processing on the two pieces of channel information to obtain the two pieces of first information and the two pieces of second information is similar to operation S304, and details are not described herein again.

S405: The terminal device performs quantization processing on the two pieces of first information and the two pieces of second information, to obtain two pieces of first information obtained through quantization processing and two pieces of second information obtained through quantization processing.

In this embodiment, that the terminal device performs quantization processing on the two pieces of first information to obtain the two pieces of first information obtained through quantization processing is similar to operation S305, and details are not described herein again. Quantization processing may be performed on the second information in two manners. To ensure a relative value of energy between a plurality of pieces of channel information, one manner is that the terminal device determines one piece of second information from the two pieces of second information as reference information, that is, the reference information is set to 1 as a quantization reference, and then quantization processing is performed on relative values between the two pieces of second information and the reference information, to obtain the two pieces of second information obtained through quantization processing. In addition, to improve accuracy of fed-back downlink large-scale information and improve performance, the other manner is that the terminal device determines one piece of second information from the two pieces of second information as reference information, that is, sets the reference information to 1 as a quantization reference, then performs quantization processing on relative values between the two pieces of second information and the reference information, and performs quantization processing on an absolute value of the reference information, to obtain the two pieces of second information obtained through quantization processing.

In some embodiments, the reference information may be a largest value of two pieces of second information, or a smallest value of two pieces of second information; or second information corresponding to a network device initially accessed by the terminal device is the reference information; or second information corresponding to a cell initially accessed by the terminal device is the reference information; or second information of any network device is the reference information; or second information corresponding to a network device with a smallest identifier is the reference information; or second information corresponding to a network device with a largest identifier is the reference information. A manner of determining the reference information is not limited herein.

S406: The terminal device sends CSI to the two network devices, where the CSI includes the two pieces of first information obtained through quantization processing.

In this embodiment, a manner in which the terminal device sends the CSI to the two network devices is similar to operation S306, and details are not described herein again. In this case, the CSI includes two pieces of first information obtained through quantization processing and two pieces of second information obtained through quantization processing.

S407: The network device obtains target channel information based on the two pieces of first information obtained through quantization processing and the two pieces of second information obtained through quantization processing.

A manner in which the network device obtains the target channel information based on the two pieces of first information obtained through quantization processing and the two pieces of second information obtained through quantization processing is similar to operation S202, and details are not described herein again.

The foregoing mainly describes the solutions provided in embodiments of this application from the perspective of the methods. It may be understood that, to implement the foregoing functions, the communication apparatus includes a hardware structure and/or a software module for performing corresponding functions. A person of ordinary skill in the art should easily be aware that, in combination with the examples described in embodiments disclosed in this specification, modules, algorithms and operations may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into function modules based on the foregoing method examples. For example, functional module may be obtained through division based on functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 7:
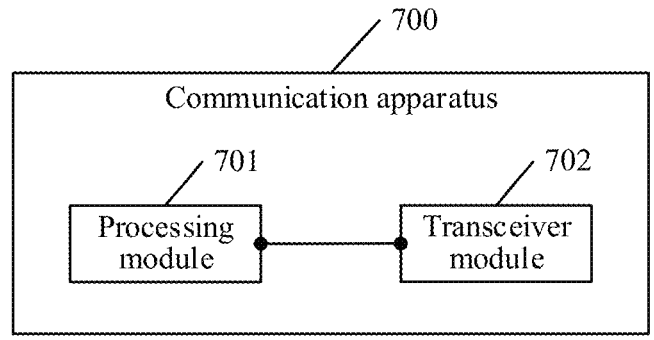
FIG. 7 is a schematic diagram of an embodiment of a communication apparatus according to an embodiment of this application.

The following describes a communication apparatus in this application in detail. FIG. 7 is a schematic diagram of an embodiment of a communication apparatus according to an embodiment of this application. As shown in the figure, the communication apparatus 700 includes a processing module 701 and a transceiver module 702.

In some embodiments, the communication apparatus 700 may correspond to the terminal device in the foregoing method embodiment, for example, may be a terminal device, or a component (such as a circuit, a chip, or a chip system) configured in the terminal device.

It should be understood that the communication apparatus 700 may correspond to the method in FIG. 3, the method in FIG. 5, or the method in FIG. 6 according to embodiments of this application. The communication apparatus 700 may include units configured to perform the method performed by the terminal device in the method in FIG. 3, the method in FIG. 5, or the method in FIG. 6. In addition, the units in the communication apparatus 700 and the foregoing other operations and/or functions are respectively used to implement corresponding procedures in the method in FIG. 3, the method in FIG. 5, or the method in FIG. 6.

When the communication apparatus 700 is configured to perform the method in FIG. 3, the processing module 701 may be configured to perform operation S101 and operation S102 of the method in FIG. 3, and the transceiver module 702 may be configured to perform operation S103 of the method in FIG. 3. It should be understood that a process in which the units perform the foregoing corresponding operations is described in detail in the foregoing method embodiments, and for brevity, details are not described herein.

When the communication apparatus 700 is configured to perform the method in FIG. 5, the processing module 701 may be configured to perform operation S301, operation S302, operation S303, operation S304, and operation S305 of the method in FIG. 5, and the transceiver module 702 may be configured to perform operation S306 of the method in FIG. 5. It should be understood that a process in which the units perform the foregoing corresponding operations is described in detail in the foregoing method embodiments, and for brevity, details are not described herein.

When the communication apparatus 700 is configured to perform the method in FIG. 6, the processing module 701 may be configured to perform operation S401, operation S402, operation S403, operation S404, and operation S405 of the method in FIG. 6, and the transceiver module 702 may be configured to perform operation S406 of the method in FIG. 6. It should be understood that a process in which the units perform the foregoing corresponding operations is described in detail in the foregoing method embodiments, and for brevity, details are not described herein.

Figure 9:
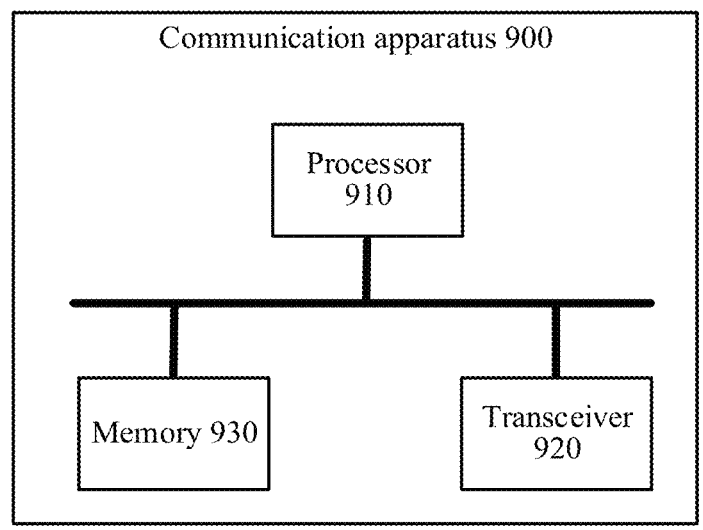
FIG. 9 is a schematic block diagram of a communication apparatus according to an embodiment of this application.
Figure 10:
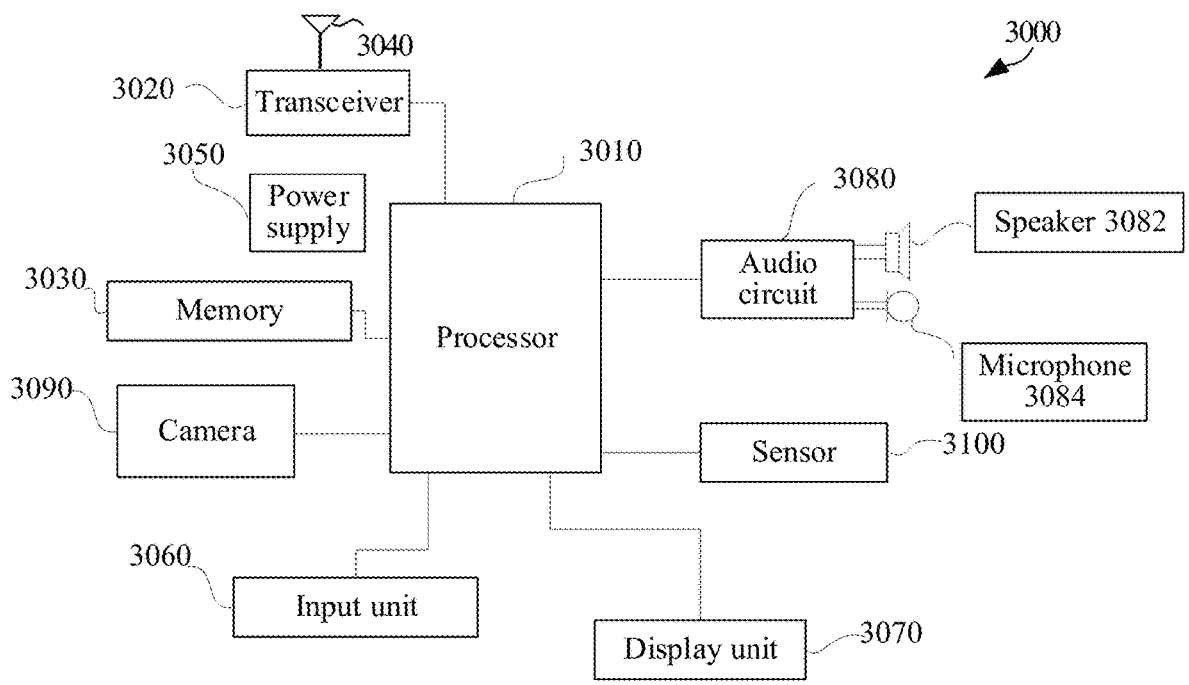
FIG. 10 is a schematic diagram of a structure of a terminal device according to an embodiment of this application.

It should be further understood that when the communication apparatus 700 is a terminal device, the transceiver module 702 in the communication apparatus 700 may be implemented by using a transceiver, for example, may be corresponding to the transceiver 920 in the communication apparatus 900 shown in FIG. 9 or the transceiver 3020 in the terminal device 3000 shown in FIG. 10. The processing module 701 in the communication apparatus 700 may be implemented by using at least one processor, for example, may be corresponding to the processor 910 in the communication apparatus 900 shown in FIG. 9 or the processor 3010 in the terminal device 3000 shown in FIG. 10.

It should be further understood that, when the communication apparatus 700 is a chip or a chip system configured in a terminal device, the transceiver module 702 in the communication apparatus 700 may be implemented by using an input/output interface, a circuit, or the like, and the processing module 701 in the communication apparatus 700 may be implemented by using a processor, a microprocessor, an integrated circuit, or the like integrated in the chip or the chip system.

Figure 8:
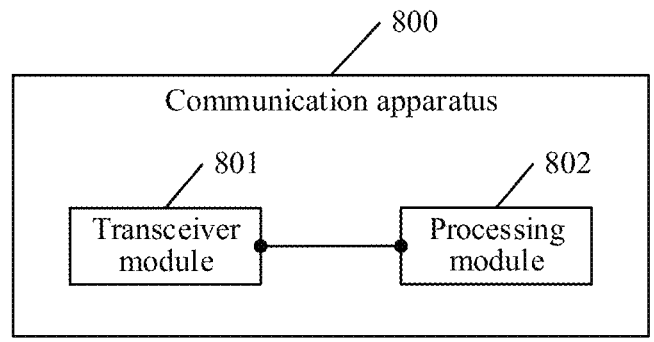
FIG. 8 is a schematic diagram of another embodiment of a communication apparatus according to an embodiment of this application.

FIG. 8 is a schematic diagram of another embodiment of a communication apparatus according to an embodiment of this application. As shown in the figure, the communication apparatus 800 includes a transceiver module 801 and a processing module 802.

In some embodiments, the communication apparatus 800 may be corresponding to the network device in the foregoing method embodiment, for example, may be a network device, or a component (such as a circuit, a chip, or a chip system) configured in the network device.

It should be understood that the communication apparatus 800 may correspond to the method in FIG. 4, the method in FIG. 5, or the method in FIG. 6 according to embodiments of this application. The communication apparatus 800 may include units configured to perform the method performed by the network device in the method in FIG. 4, the method in FIG. 5, or the method in FIG. 6. In addition, the units in the communication apparatus 800 and the foregoing other operations and/or functions are respectively used to implement corresponding procedures in the method in FIG. 4, the method in FIG. 5, or the method in FIG. 6.

When the communication apparatus 800 is configured to perform the method in FIG. 4, the transceiver module 801 may be configured to perform operation S201 of the method in FIG. 4, and the processing module 802 may be configured to perform operation S202 of the method in FIG. 4. It should be understood that a process in which the units perform the foregoing corresponding operations is described in detail in the foregoing method embodiments, and for brevity, details are not described herein.

When the communication apparatus 800 is configured to perform the method in FIG. 5, the transceiver module 801 may be configured to perform operation S301 and operation S306 of the method in FIG. 5, and the processing module 802 may be configured to perform operation S307 and operation S308 of the method in FIG. 5. It should be understood that a process in which the units perform the foregoing corresponding operations is described in detail in the foregoing method embodiments, and for brevity, details are not described herein.

When the communication apparatus 800 is configured to perform the method in FIG. 6, the transceiver module 801 may be configured to perform operation S401 and operation S406 of the method in FIG. 6, and the processing module 802 may be configured to perform operation S407 of the method in FIG. 6. It should be understood that a process in which the units perform the foregoing corresponding operations is described in detail in the foregoing method embodiments, and for brevity, details are not described herein.

It should be further understood that, when the communication apparatus 800 is a network device, the transceiver module 801 in the communication apparatus 800 may be implemented by using a transceiver, for example, may be corresponding to the transceiver 920 in the communication apparatus 900 shown in FIG. 9 or a remote radio unit (RRU) 4100 in the network device 4000 shown in FIG. 9. The processing module 802 in the communication apparatus 800 may be implemented by using at least one processor, for example, may be corresponding to the processor 910 in the communication apparatus 900 shown in FIG. 9 or the processing unit 4200 or the processor 4202 in the network device 4000 shown in FIG. 11.

It should be further understood that, when the communication apparatus 800 is a chip or a chip system configured in a network device, the transceiver module 801 in the communication apparatus 800 may be implemented by using an input/output interface, a circuit, or the like, and the processing module 802 in the communication apparatus 800 may be implemented by using a processor, a microprocessor, an integrated circuit, or the like integrated in the chip or the chip system.

FIG. 9 is a schematic block diagram of a communication apparatus 900 according to an embodiment of this application. As shown in FIG. 9, the communication apparatus 900 includes a processor 910, a transceiver 920, and a memory 930. The processor 910, the transceiver 920, and the memory 930 communicate with each other by using an internal connection path. The memory 930 is configured to store an instruction. The processor 910 is configured to execute the instruction stored in the memory 930, to control the transceiver 920 to send a signal and/or to receive a signal.

It should be understood that the communication apparatus 900 may correspond to the terminal device in the foregoing method embodiments, and may be configured to perform operations and/or procedures performed by the network device or the terminal device in the foregoing method embodiments. In some embodiments, the memory 930 may include a read-only memory and a random access memory, and provide instructions and data for the processor. A part of the memory may further include a non-volatile random access memory. The memory 930 may be an independent component, or may be integrated into the processor 910. The processor 910 may be configured to execute the instruction stored in the memory 930, and when the processor 910 executes the instruction stored in the memory, the processor 910 is configured to perform operations and/or procedures corresponding to the network device or the terminal device in the foregoing method embodiments.

In some embodiments, the communication apparatus 900 is the terminal device in the foregoing embodiment.

In some embodiments, the communication apparatus 900 is the network device in the foregoing embodiment.

The transceiver 920 may include a transmitter and a receiver. The transceiver 920 may further include an antenna, and there may be one or more antennas. The processor 910, the memory 930, and the transceiver 920 may be components integrated into different chips. For example, the processor 910 and the memory 930 may be integrated into a baseband chip, and the transceiver 920 may be integrated into a radio frequency chip. The processor 910, the memory 930, and the transceiver 920 may alternatively be components integrated into a same chip. This is not limited in this application.

In some embodiments, the communication apparatus 900 is a component configured in the terminal device, for example, a circuit, a chip, or a chip system.

In some embodiments, the communication apparatus 900 is a component configured in the network device, for example, a circuit, a chip, or a chip system.

The transceiver 920 may alternatively be a communication interface, for example, an input/output interface or a circuit. The transceiver 920, the processor 910, and the memory 920 may be integrated into a same chip, for example, integrated into a baseband chip.

FIG. 10 is a schematic diagram of a structure of a terminal device 3000 according to an embodiment of this application. The terminal device 3000 may be used in the system shown in FIG. 1, and performs a function of the terminal device in the foregoing method embodiments. As shown in the figure, the terminal device 3000 includes a processor 3010 and a transceiver 3020. In some embodiments, the terminal device 3000 further includes a memory 3030. The processor 3010, the transceiver 3020, and the memory 3030 may communicate with each other by using an internal connection path, to transfer a control signal and/or a data signal. The memory 3030 is configured to store a computer program. The processor 3010 is configured to invoke the computer program from the memory 3030 and run the computer program, to control the transceiver 3020 to send and receive a signal. In some embodiments, the terminal device 3000 may further include an antenna 3040, configured to send, by using a radio signal, uplink data or uplink control signaling output by the transceiver 3020.

The processor 3010 and the memory 3030 may be combined into one communication apparatus. The processor 3010 is configured to execute program code stored in the memory 3030 to implement the foregoing functions. In some embodiments, the memory 3030 may alternatively be integrated into the processor 3010, or may be independent of the processor 3010. The processor 3010 may correspond to the processing module 701 in FIG. 7 or the processor 910 in FIG. 9.

The transceiver 3020 may correspond to the transceiver module 702 in FIG. 7 or the transceiver 920 in FIG. 9. The transceiver 3020 may include a receiver (which is also referred to as a receiver machine or a receiver circuit) and a transmitter (which is also referred to as a transmitter machine or a transmitter circuit). The receiver is configured to receive a signal, and the transmitter is configured to transmit a signal.

It should be understood that the terminal device 3000 shown in FIG. 10 can implement the processes of the terminal device in the method embodiment shown in FIG. 3, FIG. 5, or FIG. 6. Operations and/or functions of the modules in the terminal device 3000 are separately intended to implement corresponding procedures in the foregoing method embodiments. For details, refer to the descriptions in the foregoing method embodiments. To avoid repetition, detailed descriptions are properly omitted herein.

The processor 3010 may be configured to perform an action that is implemented inside the terminal device and that is described in the foregoing method embodiments. The transceiver 3020 may be configured to perform a sending action by the terminal device for the network device or a receiving operation from the network device in the foregoing method embodiments. For details, refer to the descriptions in the foregoing method embodiments. Details are not described herein again.

In some embodiments, the terminal device 3000 may further include a power supply 3050, configured to supply power to various components or circuits in the terminal device.

In addition, to improve functions of the terminal device, the terminal device 3000 may further include one or more of an input unit 3060, a display unit 3070, an audio circuit 3080, a camera 3090, a sensor 3100, and the like. The audio circuit may further include a speaker 3082, a microphone 3084, and the like.

Figure 11:
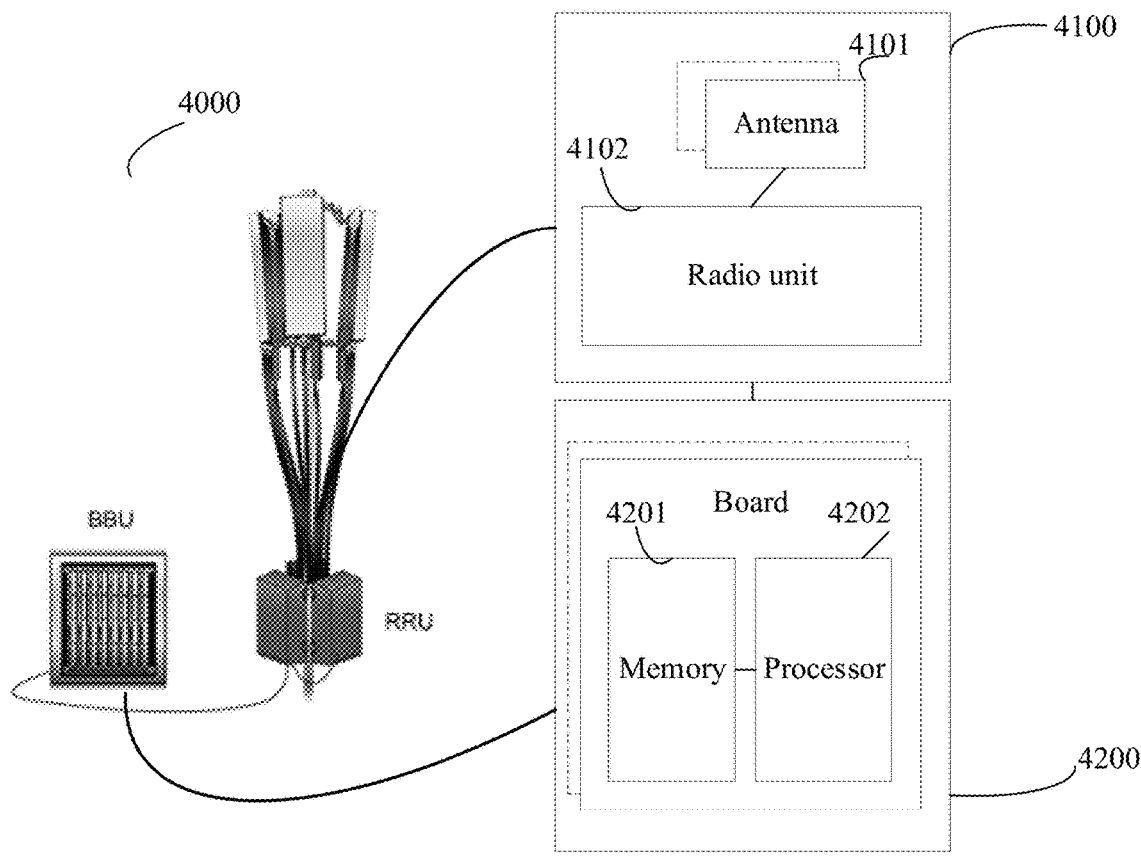
FIG. 11 is a schematic diagram of a structure of a network device according to an embodiment of this application.

FIG. 11 is a schematic diagram of a structure of a network device according to an embodiment of this application, for example, may be a schematic diagram of a structure of a base station. The base station 4000 may be used in the system shown in FIG. 1, and performs a function of the network device in the foregoing method embodiments. As shown in the figure, the base station 4000 may include one or more radio frequency units, such as an RRU 4100 and one or more baseband units (BBU) (which may also be referred to as a distributed unit (DU)) 4200. The RRU 4100 may be referred to as a transceiver unit, and may correspond to the transceiver module 802 in FIG. 8 or the transceiver 2020 in FIG. 9. In some embodiments, the RRU 4100 may also be referred to as a transceiver machine, a transceiver circuit, a transceiver, or the like, and may include at least one antenna 4101 and a radio frequency unit 4102. In some embodiments, the RRU 4100 may include a receiving unit and a sending unit. The receiving unit may correspond to a receiver (which is also referred to as a receiver machine or a receiver circuit), and the sending unit may correspond to a transmitter (which is also referred to as a transmitter machine or a transmitter circuit). The RRU 4100 is mainly configured to: receive and send a radio frequency signal, and perform conversion between the radio frequency signal and a baseband signal. For example, the RRU 4100 is configured to send indication information to a terminal device. The BBU 4200 is mainly configured to: perform baseband processing, control the base station, and so on. The RRU 4100 and the BBU 4200 may be physically disposed together, or may be physically disposed separately, namely, a distributed base station.

The BBU 4200 is a control center of the base station, may also be referred to as a processing unit, may correspond to the processing module 802 in FIG. 8 or the processor 910 in FIG. 9, and is mainly configured to complete a baseband processing function, for example, channel coding, multiplexing, modulation, and spreading. For example, the BBU (the processing unit) may be configured to control the base station to perform an operation procedure related to the network device in the foregoing method embodiments, for example, generate the foregoing indication information.

In an example, the BBU 4200 may include one or more boards, and a plurality of boards may jointly support a radio access network (for example, an LTE network) having a single access standard, or may separately support radio access networks (for example, the LTE network, a 5G network, or another network) having different access standards. The BBU 4200 further includes a memory 4201 and a processor 4202. The memory 4201 is configured to store instructions and data. The processor 4202 is configured to control the base station to perform an action, for example, control the base station to perform the operation procedure related to the network device in the foregoing method embodiments. The memory 4201 and the processor 4202 may serve one or more boards. In other words, a memory and a processor may be disposed on each board. Alternatively, a plurality of boards may share a same memory and a same processor. In addition, a circuit may further be disposed on each board.

It should be understood that, the base station 4000 shown in FIG. 11 can implement processes related to the network device in the method embodiments shown in FIG. 4, FIG. 5, and FIG. 6. The operations and/or the functions of the modules in the base station 4000 are separately intended to implement corresponding procedures in the foregoing method embodiments. For details, refer to the descriptions in the foregoing method embodiments. To avoid repetition, detailed descriptions are properly omitted herein.

The BBU 4200 may be configured to perform an action that is implemented inside the network device and that is described in the foregoing method embodiments. The RRU 4100 may be configured to perform an action of sending to or receiving from the terminal device by the network device that is described in the foregoing method embodiments. For details, refer to the descriptions in the foregoing method embodiments. Details are not described herein again.

It should be understood that the base station 4000 shown in FIG. 11 is merely a possible form of the network device, and should not constitute any limitation on this application. The method provided in this application is applicable to a network device in another form. For example, the network device includes an AAU, and may further include a CU and/or a DU; includes a BBU and an adaptive radio unit (ARU); or includes a BBU. Alternatively, the network device may be customer premises equipment (CPE), or may be in another form. A specific form of the network device is not limited in this application.

The CU and/or the DU may be configured to perform an action that is implemented inside the network device and that is described in the foregoing method embodiments, and the AAU may be configured to perform an action of sending to the terminal device or receiving from the terminal device by the network device that is described in the foregoing method embodiments. For details, refer to the descriptions in the foregoing method embodiments. Details are not described herein again.

This application further provides a communication apparatus, including at least one processor, where the at least one processor is configured to execute a computer program stored in a memory, to enable the communication apparatus to perform the method performed by the terminal device or the network device in any one of the foregoing method embodiments.

It should be understood that the communication apparatus may be one or more chips. For example, the communication apparatus may be a field programmable gate array (FPGA), an application specific integrated circuit (ASIC), a system on chip (SoC), a central processing unit (CPU), a network processor (NP), a digital signal processing circuit (DSP), a micro controller unit (MCU), a programmable logic device (PLD), or another integrated chip.

An embodiment of this application further provides a communication apparatus, including a processor and a communication interface. The communication interface is coupled to the processor. The communication interface is configured to input and/or output information. The information includes at least one of instructions and data. The processor is configured to execute a computer program, so that the communication apparatus performs the method performed by the terminal device or the network device in any one of the foregoing method embodiments.

An embodiment of this application further provides a communication apparatus, including a processor and a memory. The memory is configured to store a computer program, and the processor is configured to invoke the computer program from the memory and run the computer program, so that the communication apparatus performs the method performed by the terminal device or the network device in any one of the foregoing method embodiments.

In an example process, operations in the foregoing methods can be implemented by using a hardware integrated logical circuit in the processor, or by using instructions in a form of software. The operations of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor. To avoid repetition, details are not described herein again.

It should be noted that, the processor in embodiments of this application may be an integrated circuit chip, and has a signal processing capability. In an example process, operations in the foregoing method embodiments can be implemented by using a hardware integrated logical circuit in the processor, or by using instructions in a form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. It may implement or perform the methods, the operations, and logical block diagrams that are disclosed in embodiments of this application. The general-purpose processor may be a microprocessor, or the processor may be any conventional processor or the like. Operations of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

According to the methods provided in embodiments of this application, this application further provides a computer program product. The computer program product includes computer program code. When the computer program code is run on a computer, the computer is enabled to perform the method performed by the terminal device or the method performed by the network device in the embodiments shown in FIG. 3 to FIG. 6.

According to the methods provided in embodiments of this application, this application further provides a computer-readable storage medium. The computer-readable storage medium stores program code. When the program code is run on a computer, the computer is enabled to perform the method performed by the terminal device or the method performed by the network device in the embodiments shown in FIG. 3 to FIG. 6.

According to the method provided in embodiments of this application, this application further provides a system. The system includes the foregoing one or more terminal devices and the foregoing one or more network devices.

The network device and the terminal device in the foregoing apparatus embodiments exactly correspond to the network device and the terminal device in the method embodiments. A corresponding module or unit performs a corresponding operation. For example, a communication unit (a transceiver) performs a receiving operation or a sending operation in the method embodiments, and a processing unit (a processor) may perform an operation other than the sending operation and the receiving operation. For a function of an example unit, refer to a corresponding method embodiment. There may be one or more processors.

In the foregoing embodiments, the terminal device may be used as an example of a receiving device, and the network device may be used as an example of a sending device. However, this shall not constitute any limitation on this application. For example, both the sending device and the receiving device may be terminal devices. Specific types of the sending device and the receiving device are not limited in this application.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for indicating a computer device (which may be a personal computer, a server, or a network device) to perform all or a part of the operations of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely example embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information transmission method, comprising:
    obtaining, by a terminal device, R pieces of channel information, wherein the channel information comprises large-scale information and small-scale information, and R is an integer greater than or equal to 1;
    performing, by the terminal device, normalization processing on the R pieces of channel information to obtain R pieces of first information and R pieces of second information, wherein the first information is small-scale information obtained through normalization processing, and the second information is large-scale information obtained through normalization processing; and
    sending, by the terminal device, channel state information (CSI), wherein the CSI comprises R pieces of first information obtained through quantization processing, or R pieces of first information obtained through quantization processing and R pieces of second information obtained through quantization processing.

2. The method according to claim 1, wherein the channel information is information in at least one frequency domain unit.

3. The method according to claim 1, wherein the first information comprises a first space domain beam set, a first frequency domain beam set, and a first weighting coefficient set,
    wherein the first information obtained through the quantization processing comprises a second space domain beam set, a second frequency domain beam set, and a second weighting coefficient set, and
    wherein the second space domain beam set is a subset of the first space domain beam set, the second frequency domain beam set is a subset of the first frequency domain beam set, and the second weighting coefficient set is obtained by quantizing a subset of the first weighting coefficient set.

4. The method according to claim 3, wherein the method further comprises:
    receiving, by the terminal device, channel measurement configuration information, wherein the channel measurement configuration information is used for determining a maximum value of a total quantity of space domain beams in R second space domain beam sets; or
    receiving, by the terminal device, channel measurement configuration information, wherein the channel measurement configuration information is used for determining a maximum value of a quantity of space domain beams in each second space domain beam set, and each second space domain beam set corresponds to a maximum value of a quantity of space domain beams in the second space domain beam set.

5. The method according to claim 4, wherein the channel measurement configuration information comprises:
    a first space domain beam value, and the first space domain beam value is used for obtaining the maximum value of the total quantity of space domain beams in the R second space domain beam sets, or
    a second space domain beam value, wherein the second space domain beam value is used for obtaining the maximum value of the quantity of space domain beams in the second space domain beam set.

6. The method according to claim 3, wherein the method further comprises:
    receiving, by the terminal device, channel measurement configuration information, wherein the channel measurement configuration information is used for determining a maximum value of a total quantity of frequency domain beams in R second frequency domain beam sets; or
    receiving, by the terminal device, channel measurement configuration information, wherein the channel measurement configuration information is used for determining a maximum value of a quantity of frequency domain beams in each second frequency domain beam set, and each second frequency domain beam set corresponds to a maximum value of a quantity of frequency domain beams in the second frequency domain beam set.

7. The method according to claim 6, wherein the channel measurement configuration information comprises:
    a first frequency domain beam value, and the first frequency domain beam value is used for obtaining the maximum value of the total quantity of frequency domain beams in the R second frequency domain beam sets; or
    a second frequency domain beam value, wherein the second frequency domain beam value is used for obtaining the maximum value of the quantity of frequency domain beams in the second frequency domain beam set.

8. The method according to claim 3, wherein the method further comprises:
    receiving, by the terminal device, channel measurement configuration information, wherein the channel measurement configuration information is used for determining a maximum value of a total quantity of weighting coefficients in R second weighting coefficient sets; or
    receiving, by the terminal device, channel measurement configuration information, wherein the channel measurement configuration information is used for determining a maximum value of a quantity of weighting coefficients in each second weighting coefficient set, and each second weighting coefficient set corresponds to a maximum value of a quantity of weighting coefficients in the second weighting coefficient set.

9. The method according to claim 3, wherein the method further comprises:
    determining, by the terminal device, a weighting coefficient in R first weighting coefficient sets as a first reference weighting coefficient, wherein the first reference weighting coefficient is a weighting coefficient with a largest amplitude in the R first weighting coefficient sets; and
    performing, by the terminal device, quantization processing on relative amplitudes and relative phases between all weighting coefficients in the R first weighting coefficient sets and the first reference weighting coefficient, to obtain R second weighting coefficient sets; or
    determining, by the terminal device, R second reference weighting coefficients in the R first weighting coefficient sets, wherein one second reference weighting coefficient corresponds to one first weighting coefficient set, and the second reference weighting coefficient is a weighting coefficient with a largest amplitude in a corresponding first weighting coefficient set;
    determining, by the terminal device, a second reference weighting coefficient in the R second reference weighting coefficients as a third reference weighting coefficient; and
    performing, by the terminal device, quantization processing on relative amplitudes and relative phases between the R first weighting coefficient sets and the corresponding second reference weighting coefficients, and performing quantization processing on relative amplitudes and relative phases between the R second reference weighting coefficients and the third reference weighting coefficient, to obtain the R second weighting coefficient sets.

10. The method according to claim 1, wherein the method further comprises:
    determining, by the terminal device, one piece of second information from the R pieces of second information as reference information; and
    performing, by the terminal device, quantization processing on relative values between the R pieces of second information and the reference information, to obtain the R pieces of second information obtained through quantization processing; or
    determining, by the terminal device, one piece of second information from the R pieces of second information as reference information; and
    performing, by the terminal device, quantization processing on relative values between the R pieces of second information and the reference information, and performing quantization processing on an absolute value of the reference information, to obtain the R pieces of second information obtained through quantization processing.

11. A communication apparatus, comprising:
    a processor, configured to:
        obtain R pieces of channel information, wherein the channel information comprises large-scale information and small-scale information, and R is an integer greater than or equal to 1; and
        perform normalization processing on the R pieces of channel information to obtain R pieces of first information and R pieces of second information, wherein the first information is small-scale information obtained through normalization processing, and wherein the second information is large-scale information obtained through normalization processing; and
    a transceiver, configured to send channel state information (CSI), wherein the CSI comprises R pieces of first information obtained through quantization processing, or R pieces of first information obtained through quantization processing and R pieces of second information obtained through quantization processing.

12. The apparatus according to claim 11, wherein the first information comprises a first space domain beam set, a first frequency domain beam set, and a first weighting coefficient set,
    wherein the first information obtained through the quantization processing comprises a second space domain beam set, a second frequency domain beam set, and a second weighting coefficient set, and
    wherein the second space domain beam set is a subset of the first space domain beam set, the second frequency domain beam set is a subset of the first frequency domain beam set, and the second weighting coefficient set is obtained by quantizing a subset of the first weighting coefficient set.

13. The apparatus according to claim 12, wherein the transceiver is further configured to receive channel measurement configuration information, wherein the channel measurement configuration information is used for determining a maximum value of a total quantity of frequency domain beams in R second frequency domain beam sets; or the transceiver is further configured to receive channel measurement configuration information, wherein the channel measurement configuration information is used for determining a maximum value of a quantity of frequency domain beams in each second frequency domain beam set, and each second frequency domain beam set corresponds to a maximum value of a quantity of frequency domain beams in the second frequency domain beam set.

14. The apparatus according to claim 13, wherein the channel measurement configuration information comprises:

a first frequency domain beam value, and the first frequency domain beam value is used for obtaining the maximum value of the total quantity of frequency domain beams in the R second frequency domain beam sets; or a second frequency domain beam value, wherein the second frequency domain beam value is used for obtaining the maximum value of the quantity of frequency domain beams in the second frequency domain beam set.

15. The apparatus according to claim 13, wherein the quantity of frequency domain beams in the R second frequency domain beam sets is less than or equal to the maximum value of the total quantity of frequency domain beams in the R second frequency domain beam sets; or the quantity of frequency domain beams in the second frequency domain beam set is less than or equal to the corresponding maximum value of the quantity of frequency domain beams in the second frequency domain beam set.

16. The apparatus according to claim 12, wherein the transceiver is further configured to:

receive channel measurement configuration information, wherein the channel measurement configuration information is used for determining a maximum value of a total quantity of weighting coefficients in R second weighting coefficient sets; or receive channel measurement configuration information, wherein the channel measurement configuration information is used for determining a maximum value of a quantity of weighting coefficients in each second weighting coefficient set, and each second weighting coefficient set corresponds to a maximum value of a quantity of weighting coefficients in the second weighting coefficient set.

17. The apparatus according to claim 16, wherein the channel measurement configuration information comprises:

a first weighting coefficient value, and the first weighting coefficient value is used for obtaining the maximum value of the total quantity of weighting coefficients in the R second weighting coefficient sets; or a second weighting coefficient value, wherein the second weighting coefficient value is used for obtaining the maximum value of the quantity of weighting coefficients in the second weighting coefficient set.

18. The apparatus according to claim 16, wherein the quantity of weighting coefficients in the R second weighting coefficient sets is less than or equal to the maximum value of the quantity of weighting coefficients in the R second weighting coefficient sets; or the quantity of weighting coefficients in the R second weighting coefficient set is less than or equal to the corresponding maximum value of the quantity of weighting coefficients in the second weighting coefficient set.

19. The apparatus according to claim 11, wherein the transceiver is further configured to receive channel measurement configuration information, wherein the channel measurement configuration information is used for determining a maximum value of a total quantity of space domain beams in R second space domain beam sets; or the transceiver is further configured to receive channel measurement configuration information, wherein the channel measurement configuration information is used for determining a maximum value of a quantity of space domain beams in each second space domain beam set, and each second space domain beam set corresponds to a maximum value of a quantity of space domain beams in the second space domain beam set.

20. A non-transitory computer-readable storage medium having instructions stored therein, which when executed by a processor, cause the processor:

obtain R pieces of channel information, wherein the channel information comprises large-scale information and small-scale information, and R is an integer greater than or equal to 1;

perform normalization processing on the R pieces of channel information to obtain R pieces of first information and R pieces of second information, wherein the first information is small-scale information obtained through normalization processing, and the second information is large-scale information obtained through normalization processing; and send channel state information (CSI), wherein the CSI comprises R pieces of first information obtained through quantization processing, or R pieces of first information obtained through quantization processing and R pieces of second information obtained through quantization processing.

* * * * *